(12) United States Patent
Shin et al.

(10) Patent No.: US 10,841,740 B2
(45) Date of Patent: Nov. 17, 2020

(54) IN-CAR LOCALIZATION FOR DETECTION OF DISTRACTED DRIVER

(71) Applicant: THE REGENTS OF THE UNIVERSITY OF MICHIGAN, Ann Arbor, MI (US)

(72) Inventors: Kang G. Shin, Ann Arbor, MI (US); Chun-Yu Chen, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/640,235

(22) PCT Filed: Aug. 24, 2018

(86) PCT No.: PCT/US2018/047959
§ 371 (c)(1),
(2) Date: Feb. 19, 2020

(87) PCT Pub. No.: WO2019/040872
PCT Pub. Date: Feb. 28, 2019

(65) Prior Publication Data
US 2020/0252749 A1 Aug. 6, 2020

Related U.S. Application Data

(60) Provisional application No. 62/549,624, filed on Aug. 24, 2017.

(51) Int. Cl.
*H04W 4/02* (2018.01)
*H04W 4/48* (2018.01)
(Continued)

(52) U.S. Cl.
CPC ............ *H04W 4/027* (2013.01); *B60W 40/08* (2013.01); *H04M 1/72569* (2013.01);
(Continued)

(58) Field of Classification Search
None
See application file for complete search history.

(56) References Cited

U.S. PATENT DOCUMENTS 9,357,054 B1 * 5/2016 Froment ........... H04M 1/72577
9,654,932 B1 * 5/2017 Mukhtar ................ G01C 21/18
(Continued)

OTHER PUBLICATIONS

Yan Wang, Yingying (Jennifer) Chen, Jie Yang, Marco Gruteser, Richard P. Martin, Hongbo Liu, Luyang Liu, and Cagdas Karatas, Determining Driver Phone Use by Exploiting Smartphone Integrated Sensors, IEEE Transactions on Mobile Computing, vol. 15, No. 8, Aug. 2016, pp. 1965-1981 (Year: 2016).*
(Continued)

*Primary Examiner* — German Viana Di Prisco
(74) *Attorney, Agent, or Firm* — Harness, Dickey & Pierce, P.L.C.

(57) ABSTRACT

An in-car phone localization scheme is proposed to determine, in real time, the locations of smartphones inside a moving car, with the goal of preventing smartphone-distracted driving. The localization system operates on commodity smartphones, and does not require any additional special/customized sensors or devices to be installed inside the car, making its deployment easy and attractive to users and carmakers. Even when a phone is moved from one location to another inside a moving car, the system will detect this movement, record the sensor data, and estimate the phone's destination location. The system captures the trajectory of each phone movement, the change of magnetic field, and the RSSI readings from the car Bluetooth transceiver, and then estimates the phone's destination location by matching the trajectory with the variation of magnetic field and the Bluetooth RSSI readings.

26 Claims, 21 Drawing Sheets

(51) Int. Cl.
*B60W 40/08* (2012.01)
*H04M 1/725* (2006.01)
*H04W 4/029* (2018.01)

(52) U.S. Cl.
CPC ....... *H04M 1/72577* (2013.01); *H04W 4/029* (2018.02); *H04W 4/48* (2018.02)

(56) References Cited

U.S. PATENT DOCUMENTS

| | | | |
|---|---|---|---|
| 10,687,171 B1* | 6/2020 | Snyder | H04W 4/029 |
| 2011/0105097 A1 | 5/2011 | Tadayon et al. | |
| 2011/0228753 A1 | 9/2011 | Polito et al. | |
| 2014/0287738 A1 | 9/2014 | Abramson et al. | |
| 2014/0364153 A1 | 12/2014 | Ren | |
| 2015/0382156 A1* | 12/2015 | Gruteser | H04W 4/44 |
| | | | 455/456.1 |
| 2016/0006860 A1* | 1/2016 | Neitzel | H04W 4/021 |
| | | | 455/419 |
| 2016/0267335 A1 | 9/2016 | Hampiholi | |
| 2017/0303095 A1* | 10/2017 | Cordova | H04M 1/725 |
| 2018/0070290 A1* | 3/2018 | Breaux | H04M 1/72577 |

OTHER PUBLICATIONS

International Search Report and Written Opinion of the International Searching Authority issued in PCT/US2018/047959, dated Dec. 11, 2018; ISA/KR.

* cited by examiner

IN-CAR LOCALIZATION FOR DETECTION OF DISTRACTED DRIVER

CROSS-REFERENCE TO RELATED APPLICATIONS

This application is the U.S. National Phase Application under 35 U.S.C. 371 of International Application No. PCT/US2018/047959 filed on Aug. 24, 2018, which claims the benefit of U.S. Provisional Application No. 62/549,624, filed on Aug. 24, 2017. The entire disclosures of the above applications are incorporated herein by reference.

FIELD

The present disclosure relates to in-car phone localization for detection of distracted drivers.

BACKGROUND

Distracted driving is an act of doing unsafe things while driving a car. Car accidents caused by distracted driving are reported to have been increasing drastically in recent years; 3,477 people were killed and 391,000 people were injured in 2015 alone in the United States (US) because of distracted driving. Moreover, more than 64% of the road accidents in the US are reported to have been related to cell phone use while driving and the likelihood of being involved in car accidents increases 23× if drivers are texting.

Recognizing the danger/risk of distracted driving and then preventing it have thus been a critically important problem. Drivers are forbidden by law from using smartphones while driving in most countries around the globe. For example, all states in the US prohibit drivers from texting while driving, and 14 states legally prohibit use of hand-held phones during driving.

Despite these legislations, recent statistics show that distracted driving caused by cell phone use is still one of the top causes of car accidents. Furthermore, over 330,000 accidents each year are due to texting while driving, representing more than 70% of the accidents caused by distracted driving. Playing games is another source of distracted driving, i.e., over 110,000 car accidents are reported to have been caused by playing Pokemon Go during driving in just 10 days.

Since legislation and self-control seem to have a very limited effect, to ensure driving safety, people start to seek solutions that can automatically prevent drivers from using their phones. Researchers and engineers attempted to solve this problem via smartphone-based detections. Their general concept is using smartphones to determine whether the driver is using a phone. Ideally, certain phone functions (e.g., texting, web browsing) will be disabled once the user of the phone is identified to be the driver.

Over the past few years, several smartphone-based solutions have been proposed, which can be classified into two categories: driver feature matching and phone localization.

Driver feature matching identifies distracted driving by determining whether the phone user matches certain driver features. The most commonly used driver feature is how the user enters the car. These approaches utilize the smartphone to monitor how the user enters the car to determine whether the phone carrier is the driver. They do not require additional devices, but they can only use the phone that enters the car with the user. Thus, these approaches are not able to prevent the driver from using the phone that does not enter the car with him or a passenger's phone.

Phone localization identifies distracted driving by locating the phone location in a car. If the phone is located in the driver's seat while it is in use, then the phone is identified as being used by the driver. These approaches can prevent the driver from using a passenger's phone and do not require the phone to monitor the users' motion before entering the car. However, they either require additional customized devices to be installed in cars or need direct control of subsystems in a car.

While these approaches have their strengths and drawbacks, this disclosure develops a new approach that has all the strengths of these approaches and eliminates their drawbacks to make it attractive to users. In this disclosure, a new phone localization (1) does not require additional customized devices or sensors to perform in-car phone localizations, (2) does not require the phone to be paired with the car, and (3) is able to identify the phone location even if the phone has moved away from its original location. This new approach is referred to herein as the Detection and Alarming of Distracted Driving (DADD SYSTEM) system.

The goal of DADD SYSTEM is to provide phone and app developers the function to determine current phone location at "seat-granularity" inside a car to prevent distracted driving. Specifically, DADD SYSTEM determines the zone (i.e., driver or passenger seat) in which a smartphone is currently located. Besides detecting a distracted driver, DADD SYSTEM can also be used to enhance in-car user experience. For example, the developers can use DADD SYSTEM to implement parental control. If the phone enters the zone with a child seat, then certain websites that may contain inappropriate contents for children can be blocked.

DADD SYSTEM may be implemented as a built-in service in the operating system of smartphones. It is designed to be deployed in smartphones with standard hardware (like GPS, Bluetooth, accelerometer, gyroscope, and magnetometer) and to be able to operate as a standalone function without any network connection. It is preferable there be a Bluetooth/BLE transceiver in the car, which is now the standard hardware of infotainment/audio systems in cars.

There are three major challenges in meeting the above requirements. First, since DADD SYSTEM is targeted to operate on a single phone without requiring any network connection, all information gathering and calculation is limited to the smartphone itself. Second, since the operating environment for DADD SYSTEM is in moving cars, it must achieve fine-grained trajectory estimation in a non-inertial frame system using only the sensors in a commodity smartphone. Third, the localization must be done by a smartphone in real time without consuming too much energy to preserve good user experience.

This section provides background information related to the present disclosure which is not necessarily prior art.

SUMMARY

This section provides a general summary of the disclosure, and is not a comprehensive disclosure of its full scope or all of its features.

A method is presented for determining location of a mobile device in a vehicle. The method includes: detecting motion of the mobile device in the vehicle between a starting position of the mobile device and an ending position of the mobile device; determining front/back motion trajectory of the mobile device during motion of the mobile device between the starting position and the ending position, where the front/back motion trajectory is determined using a motion sensor in the mobile device and is defined in relation to a first axis that aligns with direction the vehicle is travelling; determining a trend in front/back motion trajectory during motion of the mobile device between the starting position and the ending position; determining lateral motion trajectory of the mobile device during motion of the mobile device between the starting position and the ending position, where the lateral motion trajectory is defined in relation to a second axis that is perpendicular to the first axis and parallel to ground; determining a trend in lateral motion trajectory during motion of the mobile device between the starting position and the ending position; and determining a present location of the mobile device in the vehicle using the trend in front/back motion trajectory and the trend in lateral motion trajectory.

Detecting motion of the mobile device in the vehicle can be based on at least one of angular velocity of the mobile device as measured by a gyroscope in the mobile device or rate of change of magnetic field measured by a magnetometer in the mobile device.

In one embodiment, the front/back motion trajectory of the mobile device is determined by measuring acceleration of the mobile device; transforming the measured acceleration of the mobile device to a coordinate system associated with the vehicle; compensating the transformed acceleration by subtracting acceleration of the vehicle from the transformed acceleration of the mobile device; and integrating the compensated acceleration of the mobile device to derive velocity of the mobile device. Transforming the measured acceleration of the mobile device preferably includes determining direction the vehicle is travelling and determining a vector indicative of Earth's gravity.

To determine the present location of the mobile device in the vehicle further, the trend in front/back motion trajectory and the trend in lateral motion trajectory are compared to a set of predetermined signatures, such that each signature in the set of predetermined signatures represents a unique movement of the mobile device between two locations in the vehicle. The trend in front/back motion trajectory and the trend in lateral motion trajectory collectively form a signature for the detected motion of the mobile device between the starting position and the ending position. In some embodiments, each signature in the set of predetermined signatures represents a unique movement of the mobile device between two seats in the vehicle.

In response to determining the present location of the mobile device to be the driver's seat, select features of the mobile device are disabled to prevent distracted driving.

In one embodiment, the method for determining location of a mobile device in a vehicle includes: detecting motion of the mobile device in the vehicle between a starting position of the mobile device and an ending position of the mobile device; measuring, by a magnetometer in the mobile device, magnitude of magnetic field during motion of the mobile device between the starting position and the ending position; determining, by a processor in the mobile device, a trend in magnitude of the magnetic field during motion of the mobile device between the starting position and the ending position; measuring, by a wireless transceiver in the mobile device, received signal strength from a given transmitter in the vehicle during motion of the mobile device between the starting position and the ending position, where the given transmitter has a fixed position in the vehicle; determining, by the processor in the mobile device, a trend in the received signal strength during motion of the mobile device between the starting position and the ending position; determining, by the processor in the mobile device, front/back motion trajectory of the mobile device during motion of the mobile device between the starting position and the ending position, where the front/back motion trajectory is determined using a motion sensor in the mobile device and is defined in relation to a first axis that aligns with direction the vehicle is travelling; determining, by the processor in the mobile device, a trend in front/back motion trajectory during motion of the mobile device between the starting position and the ending position; determining, by the processor in the mobile device, lateral motion trajectory of the mobile device during motion of the mobile device between the starting position and the ending position, where the lateral motion trajectory is defined in relation to a second axis that is perpendicular to the first axis and parallel to ground; determining, by the processor in the mobile device, a trend in lateral motion trajectory during motion of the mobile device between the starting position and the ending position; and determining, by the processor in the mobile device, a present location of the mobile device in the vehicle using the trend in magnitude of the magnetic field, the trend in the received signal strength, the trend in front/back motion trajectory and the trend in lateral motion trajectory.

In another aspect, a system for determining location of a mobile device in a vehicle is implemented in the mobile device. The system includes: a motion sensor residing in the mobile device; a motion detector module in data communication with the motion sensor and operates to detect motion of the mobile device between a starting position of the mobile device and an ending position of the mobile device; a front/back trajectory estimator module in data communication with the motion sensor, the front/back trajectory estimator module operates to determine front/back motion trajectory of the mobile device during motion of the mobile device between the starting position and the ending position and determines a trend in front/back motion trajectory during motion of the mobile device between the starting position and the ending position, where the front/back motion trajectory is defined in relation to a first axis that aligns with direction the vehicle is travelling; a lateral trajectory estimator module in data communication with the motion sensor, the lateral trajectory estimator module determines lateral motion trajectory of the mobile device during motion of the mobile device between the starting position and the ending position and determines a trend in lateral motion trajectory during motion of the mobile device between the starting position and the ending position, where the lateral motion trajectory is defined in relation to a second axis that is perpendicular to the first axis and parallel to ground; and a location estimator module is configured to receive the trend in front/back motion trajectory and the trend in lateral motion trajectory and determines a present location of the mobile device in the vehicle using the trend in front/back motion trajectory and the trend in lateral motion trajectory, where the motion detector module, the front/back trajectory estimator module, the lateral trajectory estimator module and the location estimator module are implemented by a computer processor residing in the mobile device.

In one embodiment, the motion sensor is an accelerometer.

In some embodiments, the system may further include a magnetometer configured to measure magnitude of magnetic field during motion of the mobile device between the starting position and the ending position; and a magnetic processor configured to receive the magnetic field measures and determine a trend in magnitude of the magnetic field during motion of the mobile device between the starting position and the ending position wherein the location estimator module determines the present location of the mobile device in the vehicle in part based on the trend in magnitude of the magnetic field.

In other embodiments, the system may include a wireless transceiver configured to measure received signal strength from a given transmitter in the vehicle during motion of the mobile device between the starting position and the ending position; and a signal processor configured to receive the measured signal strength and determine a trend in the received signal strength during motion of the mobile device between the starting position and the ending position, wherein the location estimator module determines the present location of the mobile device in the vehicle in part based on the trend of the received signal strength.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
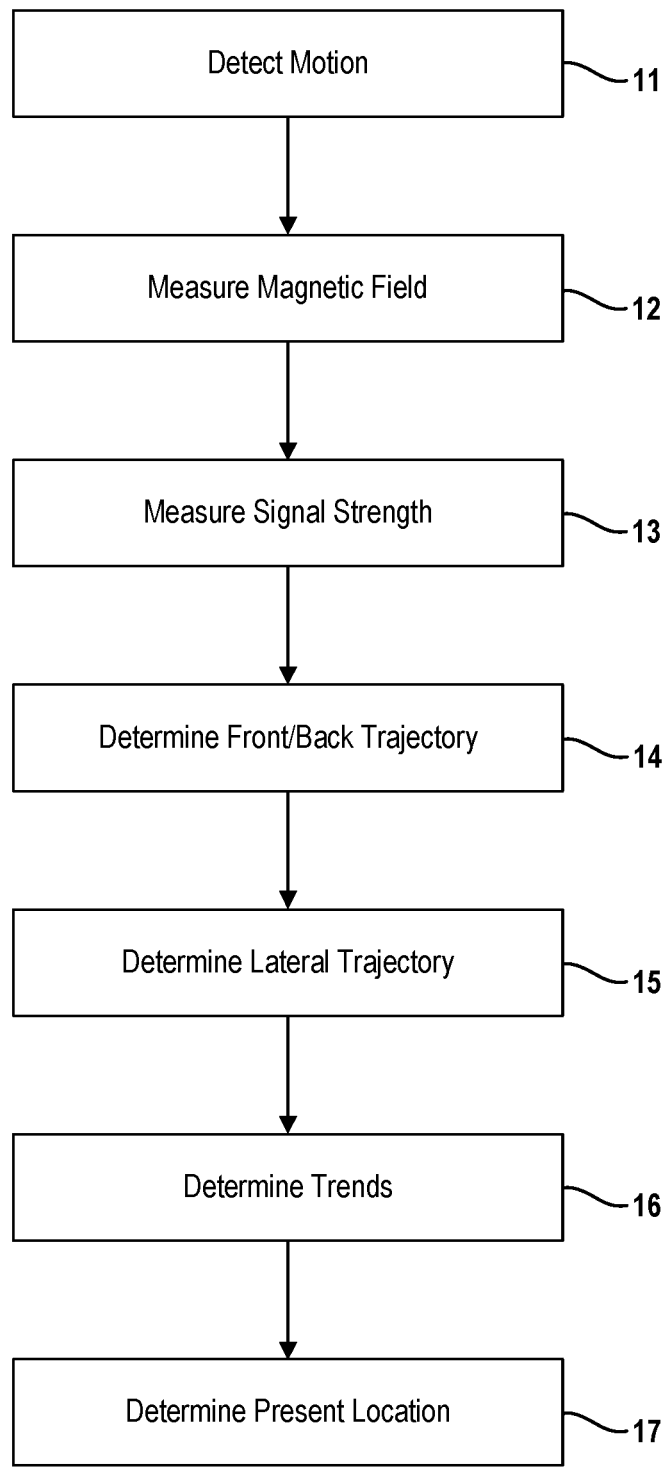
FIG. 1 is a flowchart depicting a method for determining the location of a mobile device in a vehicle.

FIG. 1 provides an overview of the proposed method for determining location of a mobile device in a vehicle. One example use case is to disable select features (e.g., texting, web browsing, emailing, etc.) of a mobile device operated by a driver of the vehicle, thereby preventing distracted driving. Determining the present location of a mobile device will also extend to other use cases as well. Likewise, while reference is made throughout this disclosure to a mobile phone, these techniques apply to tablets, gaming devices, radios, handheld medical devices, and other types of mobile devices.

Whenever a user wants to use a mobile device, he will inevitably move the phone from one location to another location within the vehicle. In the example embodiment, the mobile device is configured to detect motion of the mobile device at 11 from a starting position to an ending position, for example using an internal accelerometer as further described below. In response to detecting motion, the mobile device records sensor data which can be used to derive the location of the mobile device. In other embodiments, the mobile device may record sensor data continually while the device is in the vehicle and subsequently analyze the sensor data during the motion of the mobile device.

In an example embodiment, the magnetic field near the mobile device is measured at 12 during motion of the mobile device between the starting position and the ending position. The magnetic field may be measured by a magnetometer in the mobile device although other types of sensors may be used as well.

Assuming the vehicle is equipped with a wireless transceiver, the received signal strength from the wireless transceiver is measured during motion of the mobile device between the starting position and the ending position as indicated at 13. A Bluetooth transceiver is one example of a wireless transceiver that is commonly found in both mobile devices and vehicles. Other type of wireless transceivers (e.g., WiFi) are also contemplated. In any case, the wireless transceiver is presumed to have a fixed position in the vehicle.

Figure 12:
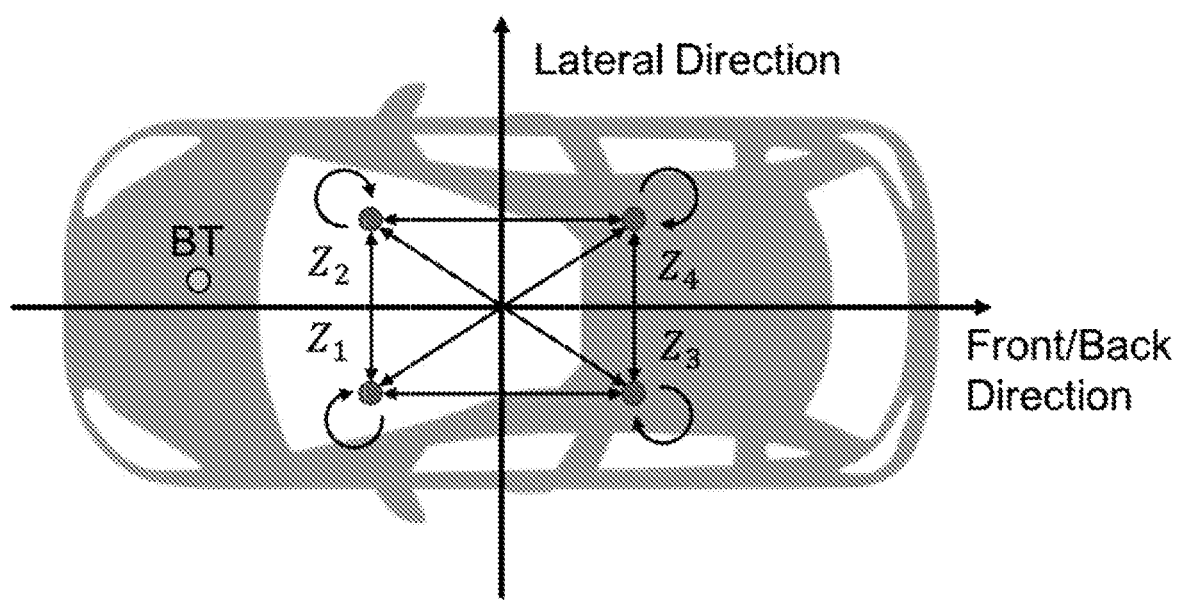
FIG. 12 is a diagram showing example zones in a car and possible phone movements between the zones in the car.

Additionally, the front/back motion trajectory and the lateral motion trajectory of the mobile device during its movement are determined at 14 and 15, respectively. With reference to FIG. 12, the front/back motion trajectory is defined in relation to a first axis that aligns with direction the vehicle is travelling; whereas, the lateral motion trajectory is defined in relation to a second axis that is perpendicular to the first axis and parallel to ground. In both cases, the motion trajectory is determined using a motion sensor (e.g., accelerometer and/or gyroscope) in the mobile device. Different techniques for determining motion trajectory are contemplated by this disclosure. In other embodiments, it is also noted that steps 12-15 are interchangeable.

Trends in these features can be used to determine the location of the mobile device in the vehicle. Trends are determined at step 16. For example, the change in received signal strength may be classified as one of increasing, decreasing, concave or convex. Similarly, motion trajectories can be classified as increasing, decreasing, concave, convex or no change. Example techniques for determining trends are further described below.

The present location of the mobile device in the vehicle can then be determined at 17 using the trends of one or more features. In one embodiment, the present location of the mobile device is determined from the trend in front/back motion trajectory and the trend in lateral motion trajectory. In a more robust embodiment, the present location of the mobile device is determined from the trend in magnitude of the magnetic field, the trend in the received signal strength, the trend in front/back motion trajectory and the trend in lateral motion trajectory. More specifically, the trend in magnitude of the magnetic field, the trend in the received signal strength, the trend in front/back motion trajectory and the trend in lateral motion trajectory collectively form a signature for the detected motion of the mobile device and are compared to a set of predetermined signatures, such that each signature in the set of predetermined signatures represents a unique movement of the mobile device between two locations (e.g., two designated seats) in the vehicle. It is to be understood that only the relevant steps of the location methodology are discussed in relation to FIG. 1, but that other software-implemented instructions may be needed to control and manage the overall operation of the system.

Figure 2:
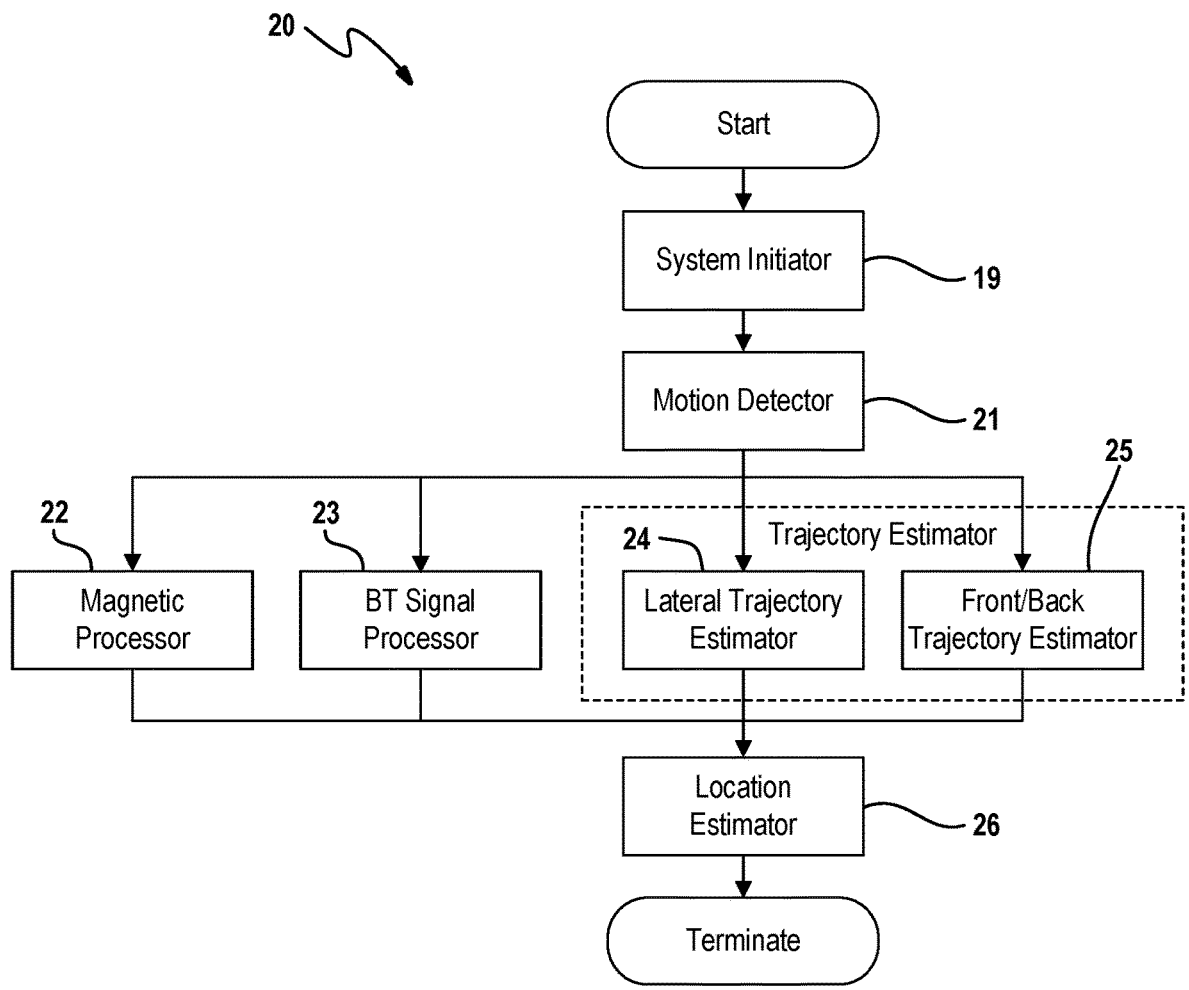
FIG. 2 is a block diagram of an example system architecture.

FIG. 2 depicts an example system architecture 20 for the system. System initiator 19 activates the location service and starts the localization process by activating motion detector module 21, for example once it determines that a phone is inside the vehicle. Motion detector 21 determines whether or not the phone is moving inside the vehicle as well as identifies the start and the end of the movement and passes that information to the subsequent components. Magnetic processor module 22 measures and tracks magnitude of magnetic field sensed by the mobile device. Bluetooth (BT) signal processor 23 measures and tracks received signal strength from a wireless transceiver in the vehicle. Lateral Trajectory Estimator module 24 and Front/Back Trajectory Estimator 25 module calculate the movement trajectory of the phone. Finally, the Location Estimator module 26 determines the phone's location after the movement using the information extracted by Magnetic Processor, 22, BT Signal Processor 23, Lateral Trajectory Estimator 24, and Front/Back Trajectory Estimator 25. Each of these components resides in the phone and is further described below. As used herein, the term module may refer to, be part of, or include an Application Specific Integrated Circuit (ASIC), an electronic circuit, and/or a processor that executes one or more software or firmware programs, a combinational logic circuit, and/or other suitable components that provide the described functionality.

System Initiator 19 determines whether or not the phone enters the car and activates Motion Detector 21 for example if the car is determined to be moving. Because the detection of entering a car has been explored elsewhere, further explanation is omitted for brevity. When the event of entering a car is detected, System Initiator 19 can determine whether or not the car is moving by monitoring the data of the phone's positioning function (e.g., GPS/WiFi localization). If the phone is moving, System Initiator 19 will activate Motion Detector 22; otherwise, it will go back to the phone position monitoring.

In the example embodiment, Motion Detector module 22 determines the start and the end time of each phone's movement based on its angular speed and/or magnetic field changing rate (MFCR). The rationale behind choosing angular speed over acceleration is that the latter depends highly on the vehicle's motion, while the former is much more stable when the vehicle is moving on a straight road segment.

Figure 3:
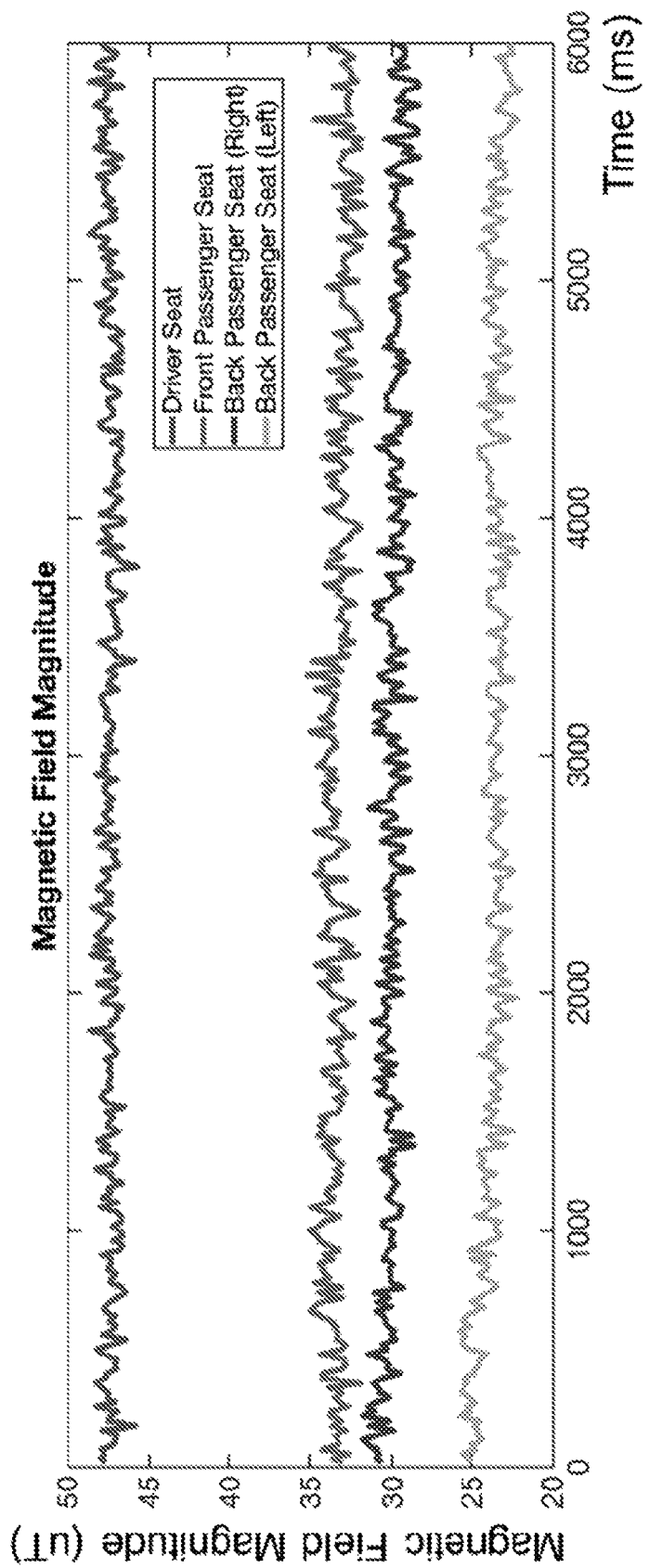
FIG. 3 is a graph showing the magnitude of magnetic field in different seats of an example vehicle.

Magnetic field (or the changing rate of the magnetic field may be used as another indicator of movement since the magnetic field magnitude varies with position as seen in FIG. 3. The reason for different levels of magnetic field magnitude between seats is that there are mechanical and electrical components inside the car inducing magnetic field. In particular, there are more such components around the driver seat, and hence, the driver seat tends to have the strongest magnetic field for cars.

Let active period $T_{active}$ be the time duration of a movement. In one embodiment, an active period is detected by the Motion Detector 21 by the following steps.

Step 1: Mark the recorded data at time t as active if angular speed exceeds the threshold $TH_{gyro}$ and extend the active time to $[t-T_{ext}, t+T_{ext}]$.

Step 2: Mark the recorded data at time t as active if MFCR exceeds the threshold $TH_{mag}$ and extend the active time to $[t-T_{ext}, t+T_{ext}]$.

Step 3: Combine the overlapped active periods and output $[t_{act,s}, t_{act,e}]$ as the detected active period.

That is, the active period is defined by the two outer most boundaries of the overlap periods.

Figures 4A, 4B:
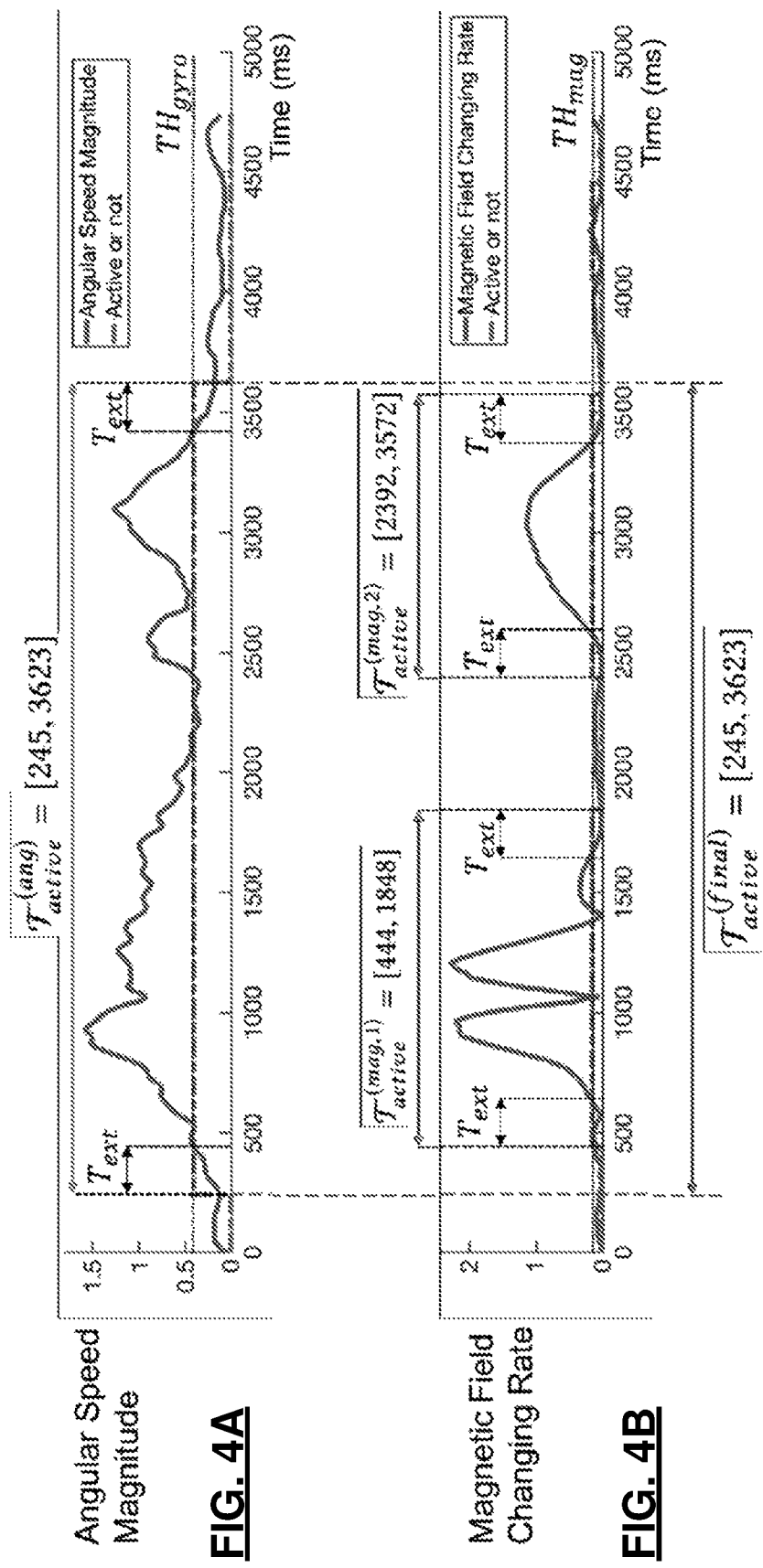
FIGS. 4A and 4B are graphs showing examples of detecting an active period from angular speed measures and magnetic field measures, respectively.

FIGS. 4A and 4B show an example of active period detection; the solid curve in FIG. 4a, is the angular speed magnitude and the dotted line is $TH_{gyro}$. Based on Step 1, the original active period is from 445 ms to 3423 ms, i.e., $T_{active}^{(ang)}=[445, 3423]$. In this example, $T_{ext}=200$ ms, so $T_{active}^{(ang)}$ is extended to $T_{active}^{(ang)}=[245, 3623]$. Similarly, in Step 2 (FIG. 4b), Motion Detector 22 captures two active periods: $T_{active}^{(mag,1)}=[444,1848]$ and $T_{active}^{(mag,2)}=[2392, 3572]$. Finally, Motion Detector 22 combines the overlapped active periods and outputs the final result $T_{active}^{(final)}=[245, 3623]$. Motion Detector 22 will then pass the detected active period $T_{active}^{(final)}=[245, 3623]$ to Magnetic Processor 22, BT Signal Processor 23, Lateral Trajectory Estimator 24, and Front/Back Trajectory Estimator 25. This example is merely illustrative of the technique set forth above for defining the active period.

After receiving the active period $T_{active}$ from Motion Detector 22, BT Signal Processor 23 processes the received signal strength from a wireless transmitter or transceiver. Since the signals usually fluctuate and are not detected at a fixed time interval, a Piece-Wise Ridge Regression (PWRR) filtering is adopted in one embodiment to eliminate transient noise. Other techniques for filtering the signals are also contemplated by this disclosure.

Figure 5:
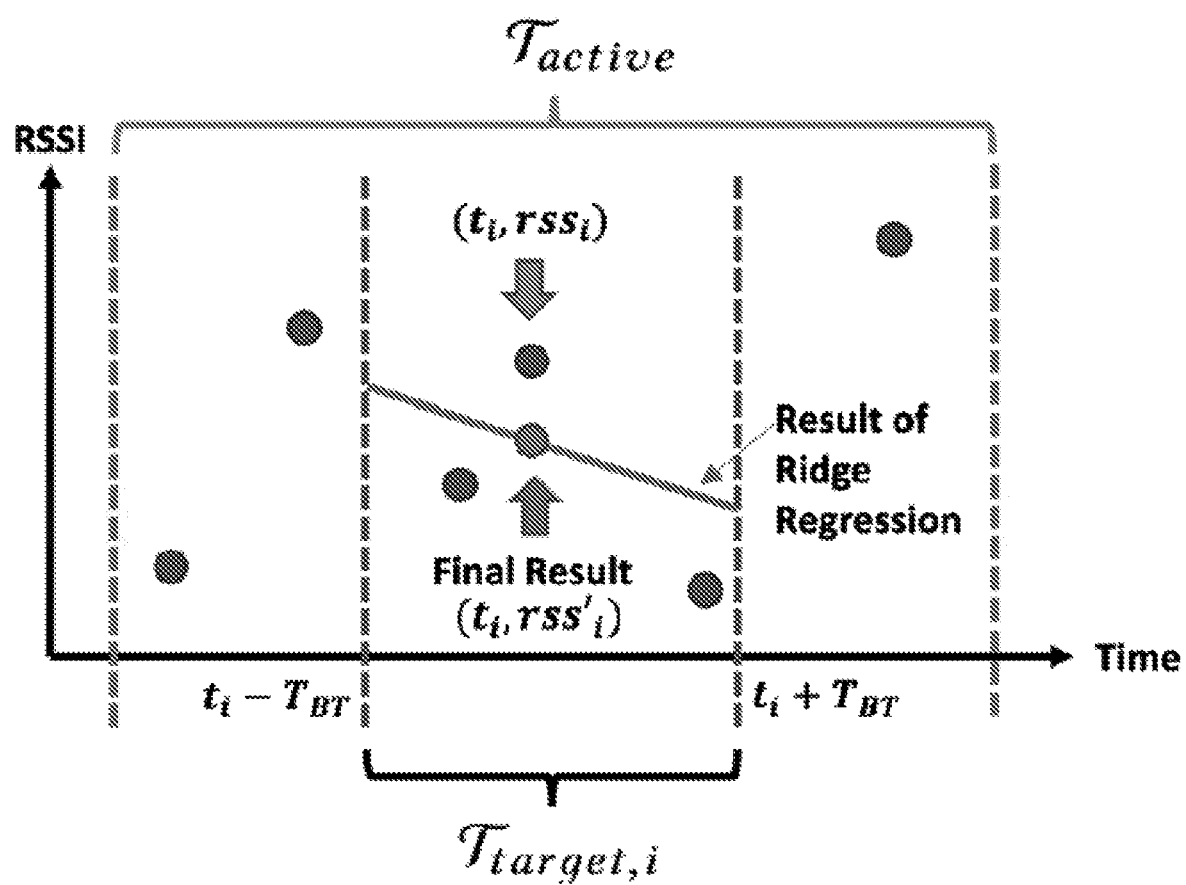
FIG. 5 is a graph showing the concept of piece-wise ridge regression (PWRR) for filtering received signals.
Figure 6:
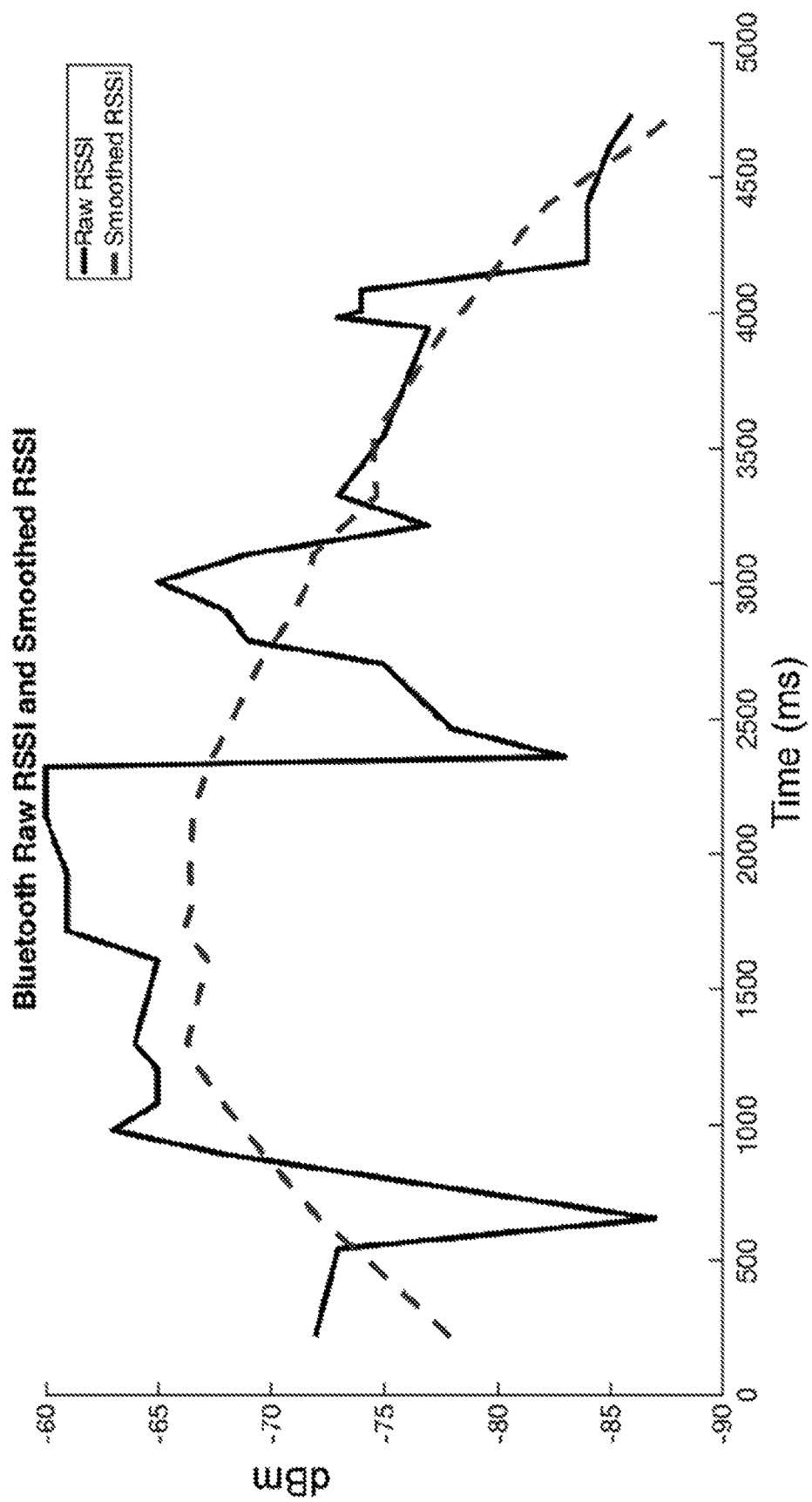
FIG. 6 is a graph showing the application of PWRR to signal strength data of a Bluetooth signal.

PWRR filtering eliminates the noise of BT signals by partitioning them into small chunks and extracts the changing trend of the signals. The pseudocode of PWRR is provided in Algorithm 1 and illustrated in FIG. 5. Raw BT RSSI data are represented by dots. For every BT data $(t_i.rss_i)$ in a given active period $T_{active}$ between two outer dashed lines, BT Signal Processor 23 will first identify all the data points in the target time window $T_{target,i}=[t_i-T_{BT}, t_i+T_{BT}]$, which are the dots between two inner dashed lines. BT Signal Processor 23 uses them as training data and then performs ridge regression to estimate the value at $t_i$. The solid line is the result of ridge regression and the dot along the line is the RSSI estimation at $t_i$. The term "smoothed" is used to denote the application of PWRR. FIG. 6 is an example of applying PWRR to RSSI data, where the solid curve is the raw data and the dashed curve is the smoothed data.

Figure 7:
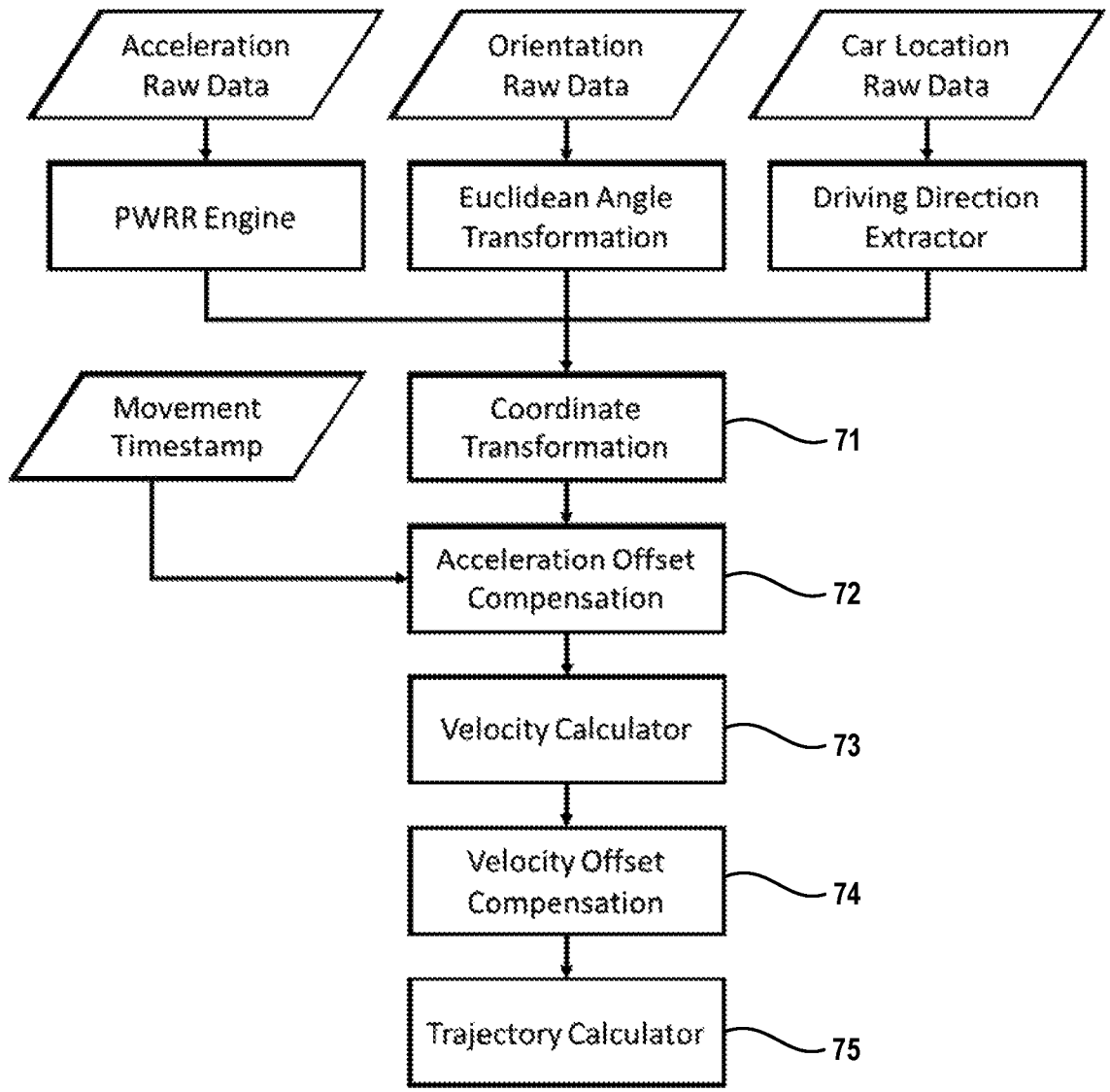
FIG. 7 is a block diagram of an example trajectory estimator module.

Algorithm 1: PWRR
Input: BT timestamp-RSSI data set $\{(t_i, rss_i)\}$, active period $\mathcal{T}_{active}=[t_{act,start}, t_{act,end}]$, and ridge regression regularization parameter $\lambda$
Output: Processed BT RSSI-timestamp data set $\{(t_i, rrs'_i)\}$
for $\forall i, t_i \in [t_{act,start}, t_{act,end}]$ do $\quad T_{target,i} = [t_i - T_{BT}, t_i + T_{BT}]$;

$\quad$ trainDataX $\leftarrow \{t_j | \forall j, t_j \in \mathcal{T}_{target,i}\}$;

$\quad$ trainDataY $\leftarrow \{rss_j | \forall j, t_j \in \mathcal{T}_{target,i}\}$;

$\quad$ testDataX $\leftarrow t_i$;

$\quad rss'_i \leftarrow$ ridgeRegression(trainDataX,trainDataY,$\lambda$,testDataX)

end
return $\{t_i, rss'_i\}$;

Trajectory Estimator (TrajEst) determines a motion trajectory for the phone during its movement in the vehicle. In the example embodiment, TrajEst calculates the lateral (to indicate the left-to-right or right-to left direction inside a car) and front/back trajectory based on the phone's acceleration $a_{[p]}(t)$ and orientation $\Theta(t)$, the car location $X_c(t)$ obtained from GPS/WiFi, and the active period $\mathcal{T}_{active}=[t_{act,s}, t_{act,e}]$. TrajEst rotates $a_{[p]}(t)$ from the phone body coordinates to geo-coordinates using orientation data and then rotates it again to the car body coordinate using car location data. After performing the coordinate transformation, TrajEst estimates the moving trajectories by performing offset compensation and acceleration integration. Further details for the TrajEst module are provided in relation to the embodiment set forth in FIG. 7.

To obtain the movement trajectory X(t) from the acceleration $a_{[p]}(t)$ recorded by the phone, $a_{[p]}(t)$ needs to be rotated to the same direction as the car body coordinate and then subtract the car acceleration. Let $a_{[p]}(t)$ denote the acceleration measured in the phone body coordinates (PBC), $a_{[g]}(t)$ be the acceleration in geo-coordinates (GC), and $a_{[c]}(t)$ as the acceleration in the car body coordinates of the car (CBC) at time t. It follows:

$$a_{[c]}(t) = a^*_{[c]}(t) - a_{car[c]}(t) \quad (1)$$

$$= R_{g2c}(t) R_{p2g}(t) a_{[p]}(t) - a_{car[c]}(t) \quad (2)$$

$$= R_{g2c}(t) a_{[g]}(t) - a_{car[c]}(t), \quad (3)$$

where $a^*_{(c)}(t)$ is the acceleration measurements of the phone represented in CBC direction, $R_{p2g}(t)$ is the rotation matrix from PBC to GC, and $R_{g2c}$ is the rotation matrix from GC to CBC. $R_{p2g}$ is calculated based on the orientation data $\Theta(t)$ collected by the phone, such as a vector indicative of Earth's gravity. To obtain $R_{g2c}(t)$, one can utilize the car location data $X_c(t)$ obtained from GPS/WiFi to determine the car's traveling direction.

This embodiment exploits the fact that the phone's movement in a car is very limited and usually follows the pattern of stay still→move→stay still. That is, the phone will be at one place for a while, be moved to another place, and then stay there. This movement pattern is used to estimate $a_{car[c]}(t)$ based on the fact that active periods are usually short (less than 5 seconds), and therefore, the car's acceleration can be estimated with a linear approximation. First, estimate $a_{car[c],s}$, the car's acceleration at the beginning of an active period, and $a_{car[c],e}$, the acceleration at the end of the active period. Second, use an interpolation to estimate the car's acceleration for the rest of active period.

Recall that Motion Detector 22 expands the start and the end of an active period by $T_{ext}$. Let $\mathcal{T}_s=[t_{act,s}, t_{act,s}+T_{ext}]$ and $\mathcal{T}_e=[t_{act,e}-T_{ext}, t_{act,e}]$ be the extended period at the start and the end of $\mathcal{T}_{active}$, respectively, and $\mathcal{T}_m=[t_{act,s}+T_{ext}, t_{act,e}-T_{ext}]$ be the period in between $\mathcal{T}_s$ and $\mathcal{T}_e$. $a_{car[c],s}$ and $a_{car[c],e}$ are estimated by calculating the means of $a^*_{(c)}$ in $\mathcal{T}_s$ and $\mathcal{T}_e$, respectively.

$$a_{car[c],s} = \text{mean}(a^*_{[c]}(\mathcal{T}_s)) \quad (4)$$

$$a_{car[c],e} = \text{mean}(a^*_{[c]}(\mathcal{T}_e)) \quad (5)$$

$a_{car[c]}(t)$ is then calculated by the following equation:

$$a_{car[c]}(t) = \begin{cases} a^*_{[c]}(t), & \text{if } t \in \mathcal{T}_s \\ \frac{(t_{act,e}-T_{ext})-t}{|\mathcal{T}_{active}|-2T_{ext}} a_{car[c],s} + \frac{t-(t_{act,s}+T_{ext})}{|\mathcal{T}_{active}|-2T_{ext}} a_{car[c],e}, & \text{if } t \in \mathcal{T}_m \\ a^*_{[c]}(t), & \text{if } t \in \mathcal{T}_e \end{cases} \quad (6)$$

Figure 8:
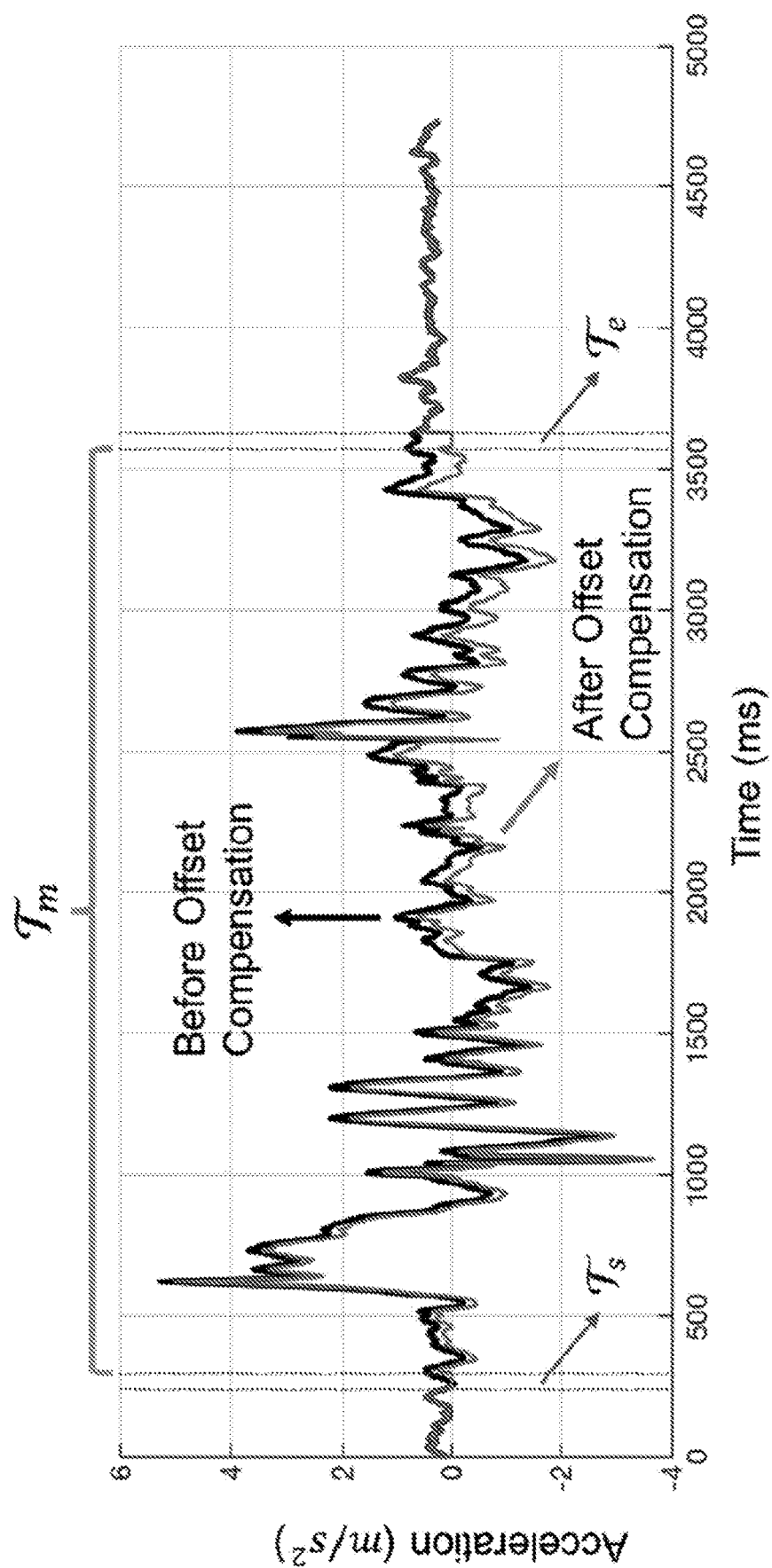
FIG. 8 is a graph showing an example of applying the offset compensation to front/back direction acceleration.

The process described in the preceding paragraphs is called offset compensation. Offset compensation can be applied to front/back acceleration and lateral acceleration. FIG. 8 shows an example of applying the offset compensation to front/back direction acceleration, where the black thick line is the raw acceleration and the thin line is the acceleration after applying the offset compensation. The rationale for applying offset compensation is that it can be used to eliminate the car acceleration $a_{car[c]}(t)$ embedded in the acceleration measured by the phone. By applying offset compensation, $a_{car[c]}(t)$ will be deducted from $a^*_{car[c]}(t)$ and one can now obtain $a_{[c]}(t)$.

After obtaining compensated acceleration, $a_{[c]}(t)$, one can integrate to get the velocity $v^*_{[c]}(t)$. Similarly, based on the special pattern of the phone's movement, one can perform the offset compensation to obtain $$v_{[c]}(t) = v^*_{[c]}(t) - v_{car[c]}(t).$$

Since the velocity is obtained by integrating the acceleration, there will be a missing constant term that cannot be obtained from the integral. Therefore, one can preferably use offset compensation to further estimate/eliminate the effect of this constant term.

Figure 9:
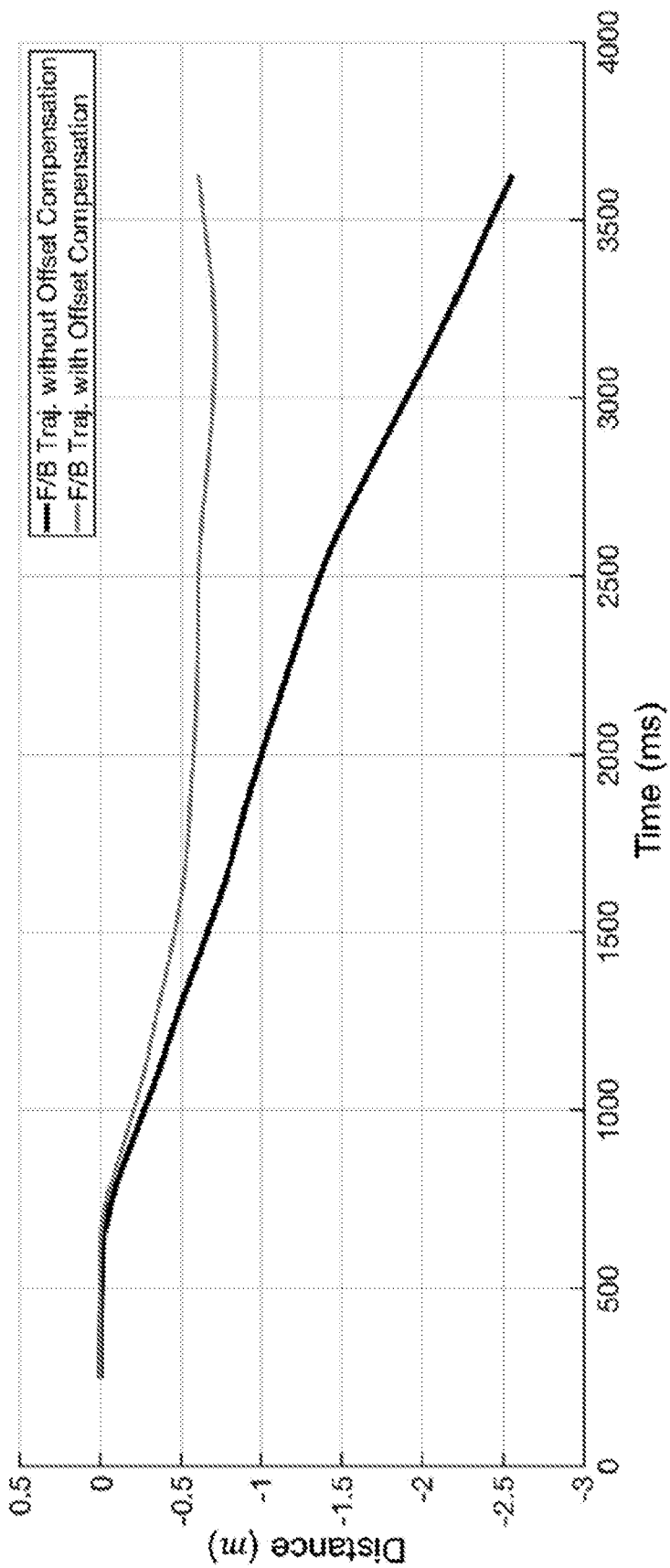
FIG. 9 is a graph showing a comparison between the final front/back trajectory estimations with and without the offset compensation.

Finally, one can obtain X(t) by integrating $v_{[c]}(t)$. FIG. 9 compares the final front/back trajectory estimations with and without the offset compensation. Without offset compensation, the phone is estimated to move 2.55 m while the actual movement is about 0.8 m. It is understood that a similar process is followed to determine lateral motion trajectory.

Figure 10:
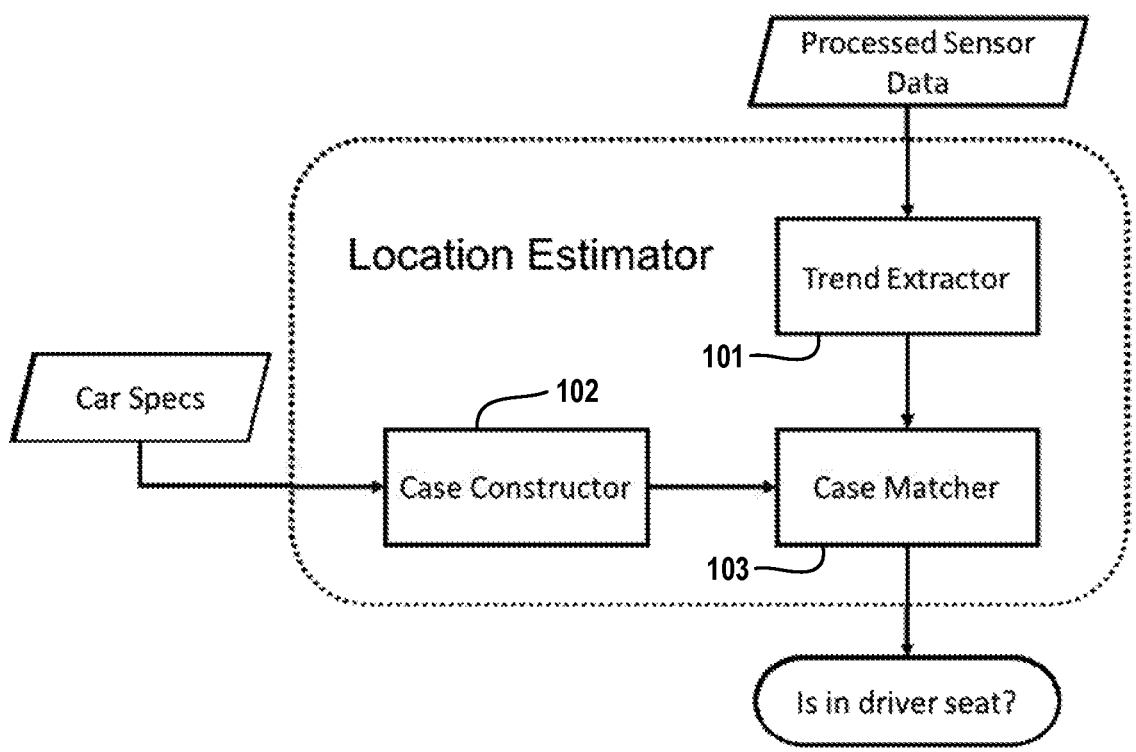
FIG. 10 is a block diagram of an example location estimator module.

Location Estimator (LocEst) 26 determines a present location of the phone in the vehicle. In one embodiment, LocEst 26 is comprised of Trend Extractor 101, Case Constructor 102, and Case Matcher 103 as seen in FIG. 10.

Location Estimator 26 takes the results from Magnetic Processor 22, BT Signal Processor 23 and Trajectory Estimators 24, 25 as inputs and determines whether or not the phone has been moved to the driver seat. Trend Extractor 101 extracts the trend of the results from previous components and passes the extracted information to Case Matcher 103. Case Matcher 103 then matches the current movement with one of the rows (cases) in the table of movement features created by Case Constructor 102 and outputs the final result.

Trend Extractor 101 determines trends in the lateral trajectory, front/back trajectory, Bluetooth RSSI, and magnetic field magnitude from the processed data. In one embodiment, each data trend is described by a quadratic polynomial function $f(t)=a+bt+ct^2$ and active period $\mathcal{T}_{active}$. Parameters a, b and c are determined by applying ridge regression to the feature vectors generated from the processed data $\{(t_i, x_i)\}$. Trend Extractor 101 transforms the processed sensor data into a feature vector by applying a nonlinear mapping $$\Phi: \mathbb{R} \to \mathbb{R}$$

More specifically, given a timestamp t, $$\Phi(t)=[1,t,t^2]^T$$

(a, b, c) is determined by solving $$\min \Sigma_i(x_i - w^T\Phi(t_i))^2 + n\lambda\|w\|^2, \text{ where } w=[a,b,c]^T.$$

Figure 11:
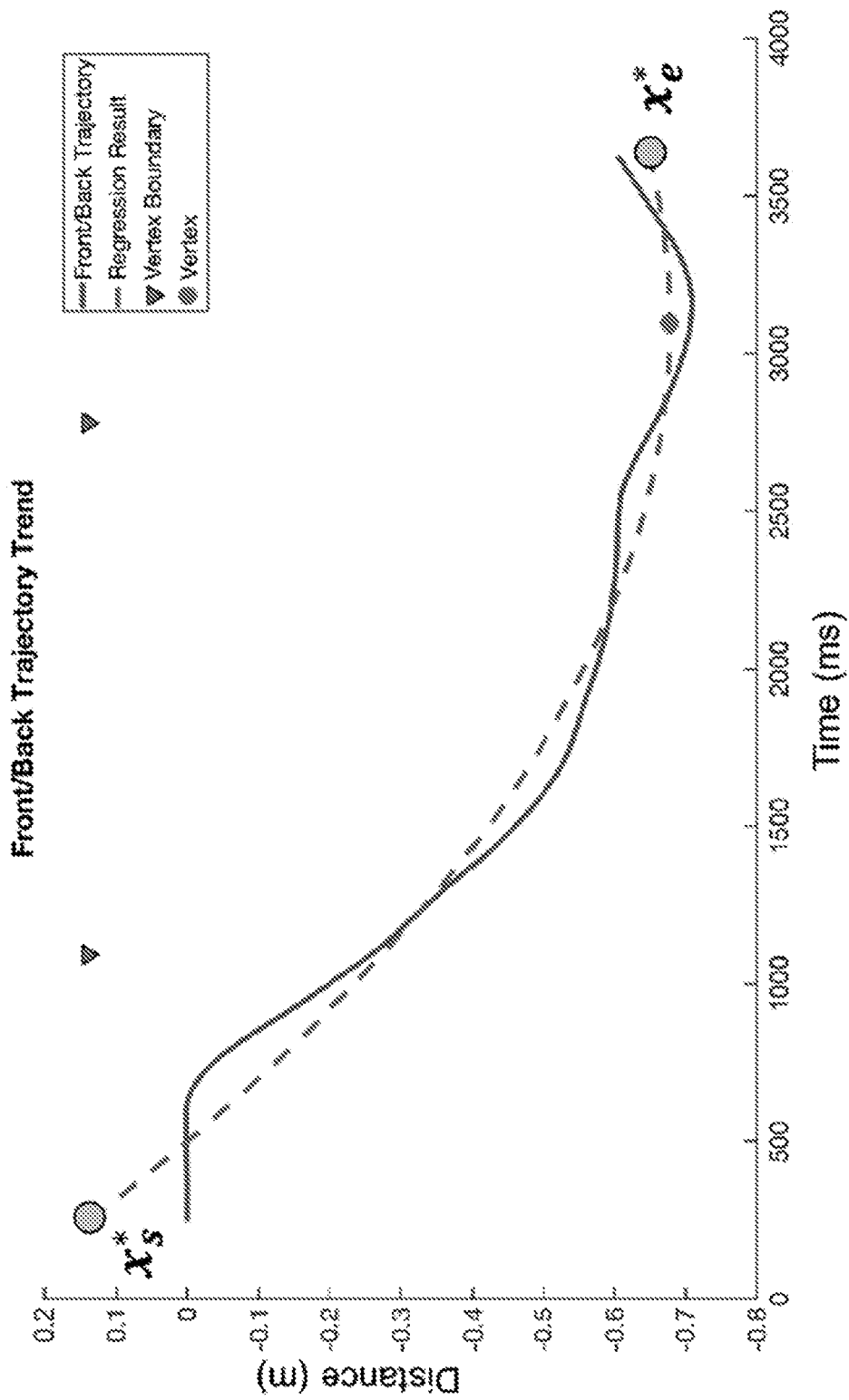
FIG. 11 is a graph showing an example of extracting trend from a front/back trajectory for example when the phone was moved from position $Z_4$ to position $Z_1$.

FIG. 11 shows an example of extracting the trend of front/back trajectory. The solid line is the data input from Trajectory Estimator and the dashed line is the regression result $f(\mathcal{T}_{active})$.

The movement feature table is constructed by Case Constructor 102 based on the car specification (this information can be entered by the user, or embedded in the BT signal), i.e., the dimension of the car and the position of the BT transceiver. Every row in the movement feature table is a possible movement case (i.e., signature). As shown in FIG. 12, the car may be divided into four zones, where $Z_1$ is the driver seat and $Z_2$-$Z_4$ are passenger seats. In this example, there are a total of 16 possible movement cases between zones. Case Constructor 102 creates a feature table with parameters, depending on the car specification with four columns for each row: 1) magnetic field magnitude, 2) Bluetooth RSSI, 3) lateral trajectory, and 4) front/back trajectory. It is understood that a vehicle may be divided into more or less zones and while a zone may correlate to a seat, it does not necessarily have to correlate to a seat.

Before introducing the possible values of each entry in the movement feature table, some notations are defined. For a given trend $f(\mathcal{T}_{active})$, let $t_{0.25}$ and $t_{0.75}$ be the timestamps of 25th and 75th percentile of the movement, which are marked with reverse triangles, and $t_v$ be the timestamp where the vertex of $f(\mathcal{T}_{active})$ is located as seen in FIG. 11. Let $x^*_s$ be the initial value of $f(\mathcal{T}_{active})$ and $x^*_e$ be the ending value of $f(\mathcal{T}_{active})$. Finally, let $x^*_{max}$ and $x^*_{min}$ denote the maximum and minimum values in $f(\mathcal{T}_{active})$. The value of each entry can be one of the following values:

Same level in strong sense (=): if $x^*_{max} - x^*_{min} < TH$, where TH is a pre-defined threshold;

Same level ($\approx$): if $|x^*_s - x^*_e| < TH$;

Concave ($\cap$): t if $t_{0.25} \le t_v \le t_{0.75}$, a<0, and is not the same level;

Convex ($\cup$): if $t_{0.25} \le t_v \le t_{0.75}$, a>0, and is not the same level;

Increasing (+): if is not the same level, convex or concave, and $x^*_s < x^*_e$;

Decreasing (−): if is not the same level, convex or concave, and $x^*_s > x^*_e$;

Not same level ($\ne$): if is not the same level in strong sense. The threshold for determining the same level can be different for each column. How to set the thresholds is described in more detail below. Here, a typical movement feature table (Table 2) is demonstrated, where the BT transceiver is embedded in the built-in infotainment system located somewhere between the driver seat and the front passenger seat. Since the values in the entries can be determined based on simple laws of physics, further details for each entry are not provided.

TABLE 2

A table of typical movement features

| Movement | Mag. Field | BT RSSI | Lat. Traj. | F/B Traj. |
|---|---|---|---|---|
| $Z_i \to Z_i$ | $\approx$ | $\approx$ | $\approx$ | $\approx$ |
| $Z_1 \to Z_2$ | + | $\cap$ | + | = |
| $Z_2 \to Z_1$ | − | $\cap$ | − | = |
| $Z_3 \to Z_4$ | = | $\cap$ | + | = |
| $Z_4 \to Z_3$ | = | $\cap$ | − | = |
| $Z_1 \to Z_3$ | − | − | = | + |
| $Z_3 \to Z_1$ | + | + | = | − |
| $Z_2 \to Z_4$ | $\ne$ | − | = | + |
| $Z_4 \to Z_2$ | $\ne$ | + | = | − |
| $Z_1 \to Z_4$ | − | $\cap$ | + | + |
| $Z_4 \to Z_1$ | + | $\cap$ | − | − |
| $Z_2 \to Z_3$ | $\ne$ | $\cap$ | − | + |
| $Z_3 \to Z_2$ | $\ne$ | $\cap$ | + | − |

The feature table is one example of a signature. Other types of signatures are also contemplated with the broader aspects of this disclosure.

Most built-in BT transceivers are located in infotainment system modules which are located between the driver seat and the front passenger seat. Therefore, DADD SYSTEM does not require users to input this information in most cases. There may be some vehicles with different settings. In such a case, car makers can embed car information in their Bluetooth signals to avoid users' need to input the information. Alternatively, the user may be required to input location of the BT transceiver.

The magnetic field entries in Table 2 are constructed based on the fact that the driver seat has the strongest magnetic field in gasoline-powered vehicles. This fact is confirmed by empirical measurements. While Table 2 shows the features of common gasoline-powered cars, electrical and hybrid electrical vehicles (EVs and HEVs) are becoming popular. Since EVs/HEVs have different mechanical structures and electrical components, they may have different magnetic field magnitude distributions from those in gasoline-powered cars. Since we do not have access to all these types of cars, here we provide theoretical discussion (applying DADD SYSTEM in more of those cars).

For a gasoline-powered vehicle, the major magnetic field sources are alternators, batteries, relay switches, engines, tires (while spinning) and other electric systems (e.g., electric steering control box). For a HEV, a plug-in HEV (PHEV) or an EV, they have another major magnetic field source, the battery system. Therefore, the distribution of magnetic field highly depends on the location of the battery system in EVs/HEVs/PHEVs. These components can emit both low- and high-frequency magnetic fields. One can utilize low-pass filters to eliminate high-frequency magnetic field variations to avoid the influence of transient noises contributed by these components (e.g., sudden variations of current from the battery system).

Batteries of HEVs are usually located under the (right) rear passenger seat while the batteries of PHEVs are usually located in the trunk. It has also been reported that the strongest magnetic field of HEVs is located in the right rear passenger seat and the driver seat has the least magnetic field among all the seats. So, one needs to reverse the value assignment of (+) and (−) in magnetic field column of Table 2 to apply DADD SYSTEM in HEVs/PHEVs/EVs with a similar structure. To adapt itself to different car makes/models, DADD SYSTEM can directly fetch the corresponding movement feature table by looking up the make and model information embedded in the BT signal.

Figure 13:
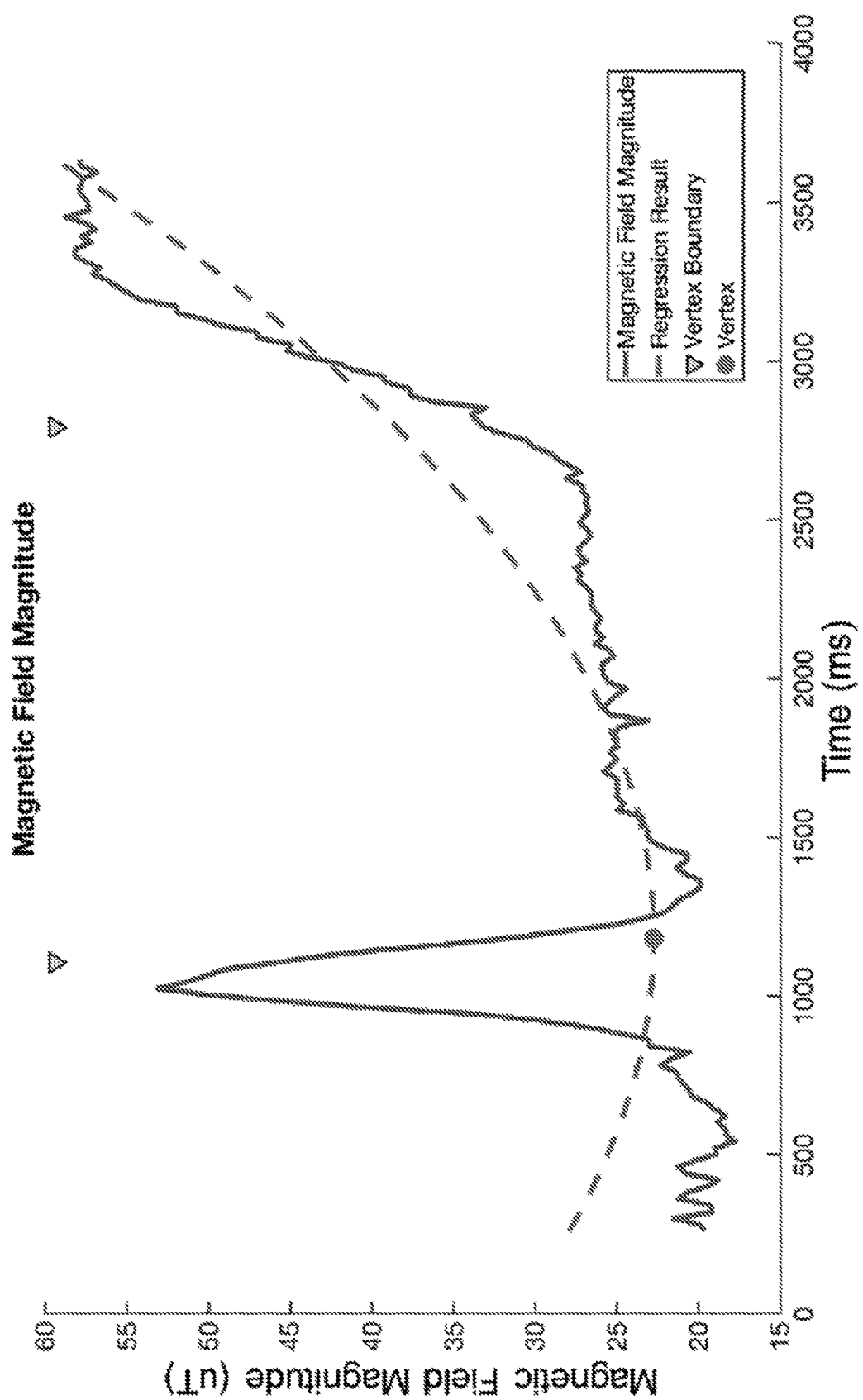
FIG. 13 is a graph showing an example of magnetic field variation and its trend when the phone was moved from position $Z_4$ to position $Z_1$; during case matching, the magnetic field variation is identified as increasing (+).
Figure 14:
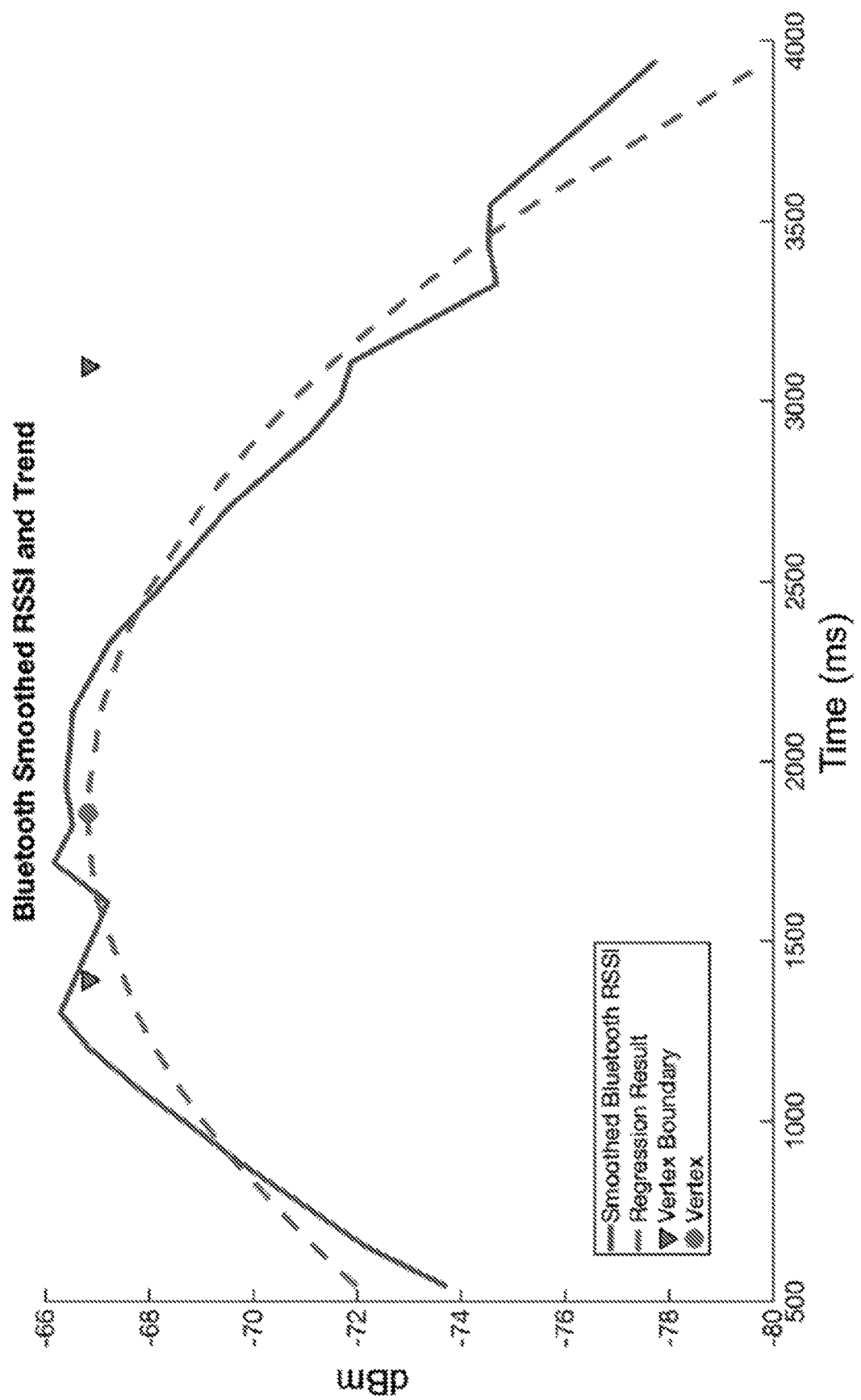
FIG. 14 is a graph showing an example of smoothed BT RSSI readings and their trend when the phone was moved from position $Z_4$ to position $Z_1$; during case matching, the BT RSSI readings are identified as concave (∩).
Figure 15:
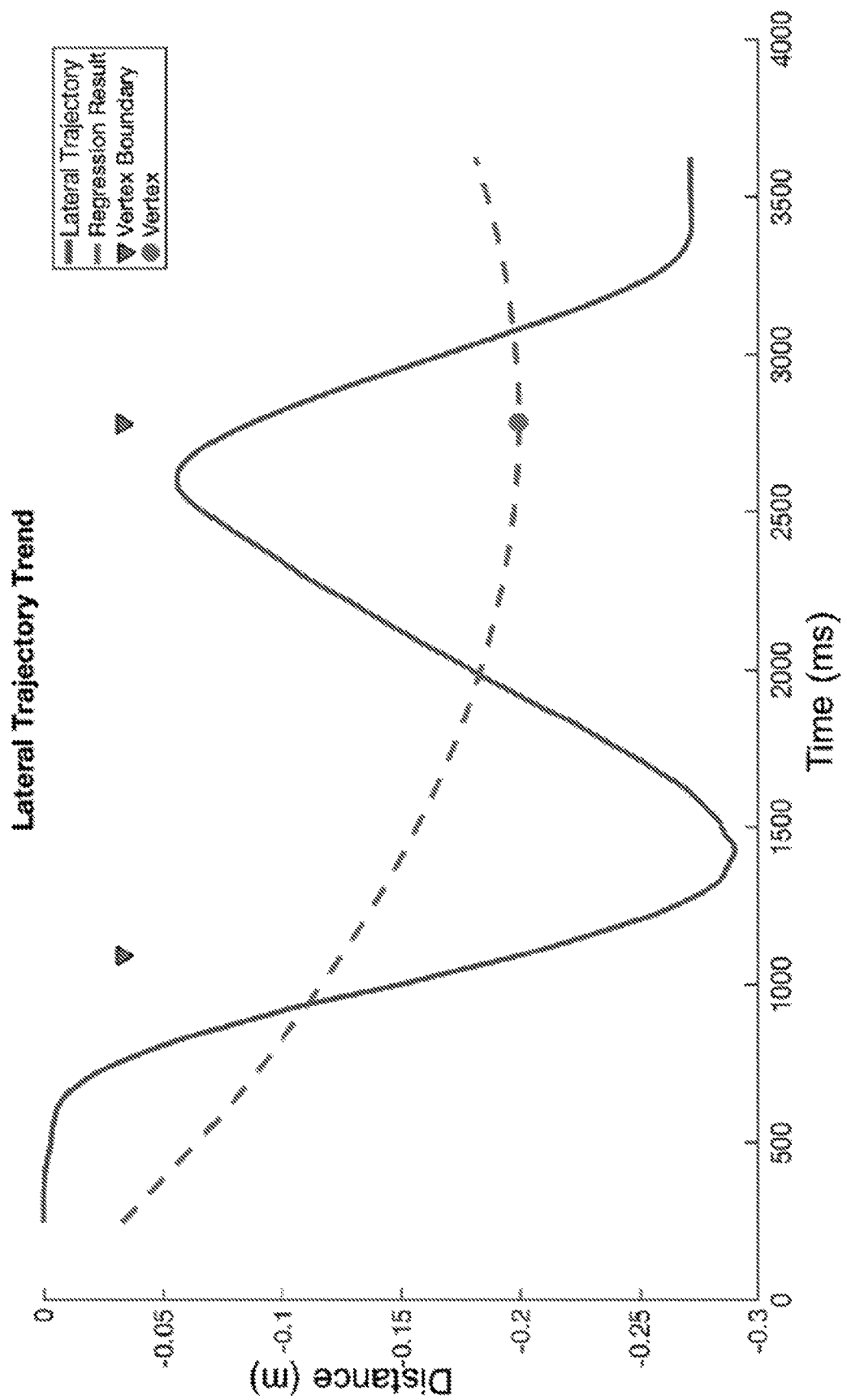
FIG. 15 is a graph showing an example of lateral trajectory and its trend when the phone was moved from position $Z_4$ to position $Z_1$; during case matching, trajectory is identified as decreasing (−).

To determine phone position, Case Matcher 103 marks the entries to be 1 in the feature table if the entry matches the corresponding trend; 0 otherwise. After marking all the entries, Case Matcher 103 takes the sum of each row (case) and finds the one with the highest score to be the final output. Let's illustrate how Case Matcher 103 works with an example when the phone was moved from position $Z_4$ to position $Z_1$. FIG. 13 shows the magnetic field and its increasing trend. FIG. 14 shows the Bluetooth RSSI and its concave trend. FIG. 15 shows the lateral trajectory and its decreasing trend. Finally, FIG. 11 shows the front/back trajectory and its decreasing trend. This trace is a perfect match of the case of $Z_4 \rightarrow Z_1$ movement, and therefore, Case Matcher 103 concludes that the phone followed the $Z_4 \rightarrow Z_1$ movement and its present location is the driver seat.

In an example implementation, DADD SYSTEM was prototyped as an Android app. While reflecting practical daily usage and safe driving, some refinements were made to enhance user experience.

Energy consumption of a phone is one of the most important factors that determine user experience. In theory, one can implement DADD SYSTEM as an "always-on" service with all the sensors operating at the highest sampling rate to achieve the best performance, but it is not practical since doing so will incur unnecessary and excessive power consumption.

Figure 16:
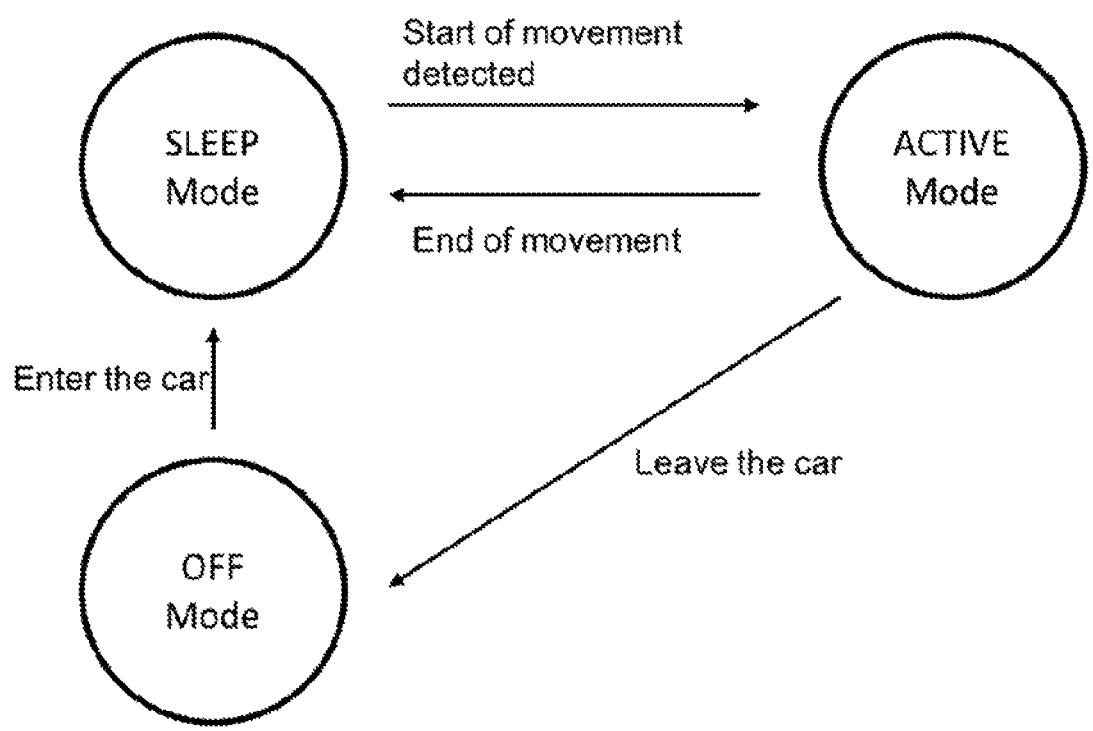
FIG. 16 is a diagram showing operating states of the DADD system.

To address this issue, a three-phase operating mechanism was introduced in the example embodiment. FIG. 16 shows the operating states of DADD SYSTEM. DADD SYSTEM stays in OFF mode when the user is not in a car. After the user enters the car, DADD SYSTEM enters SLEEP mode with only gyroscope turned on and operating at a low sampling rate only for detecting the start of the movement. In an example implementation, the sampling rate is set to 10 Hz. The start of a movement is detected by checking if the sensor value exceeds $TH^*_{gyro}$. To ensure DADD SYSTEM will have enough time for the offset compensation, $TH^*_{gyro}$ is designed to be smaller than the threshold $TH_{gyro}$ used in the Motion Detector described above.

Upon detection of the start of a movement, DADD SYSTEM enters ACTIVE mode where all the required sensors are operating at a high sampling rate. The sampling rate is set to Android's pre-defined sampling rate "SENSOR_DELAY_FASTEST" in the current implementation. When the movement ends, DADD SYSTEM goes back to SLEEP mode. If DADD SYSTEM determines that the phone is no longer in the car (e.g., DADD SYSTEM determines the phone is not in the car when it cannot receive any BT signals from the car), it will enter OFF mode. Since the detection of entering a car has been explored extensively before in other works, this disclosure focuses on the implementation of SLEEP and ACTIVE modes in the DADD SYSTEM prototype.

From the safety point of view, there is no harm to assume the phone in the driver seat although it is not. The result of this misclassification will only lead to a passenger cannot use certain functions on his phone. In contrast, it could be dangerous if the phone is in the driver seat and DADD SYSTEM fails to detect its real location, i.e., the driver has full access to his phone although he is not allowed. In one embodiment and to ensure safety, an extra 0.5 point is added to the scenarios that end in the driver seat $Z_1$. That way, DADD SYSTEM will always choose to predict the phone to be in the driver seat if there is a tie in the case matching while not violating the partial ordering of other scenarios.

Since the detection of entering a car also provides the information of the phone's initial position $z^\ell$, one can utilize this information to enhance the localization accuracy of DADD SYSTEM. Case Matcher will only consider those cases starting from $z^\ell$. If all the cases originating from $z^\ell$ have less than 2 matching entries, then Case Matcher will conclude that $z^\ell$ is wrong, and thus consider other cases.

Due to its Safety-First-Choice mechanism, DADD SYSTEM will always assume that the phone is in the driver seat if DADD SYSTEM cannot distinguish whether the movement ends in the driver seat. This may lead to false positive detections (which is safe but annoying).

Initially, this disclosure considered whether the collected sensor data matches the entries in the movement feature table. That is, if the sensor data matches the entry, DADD SYSTEM will assign 1 to that entry, otherwise 0. One can now account for how the sensor data mismatches the entries. By adopting negative score matching, DADD SYSTEM will assign −1 to the entries that have the conflicting trends in the movement feature table. That is, DADD SYSTEM will assign −1 to the entries with sensor data trend "+" while it should be "−", and vice versa.

Next, this disclosure discusses how to utilize DADD SYSTEM for general in-car localization and prevent distracted driving. Specifically, it will discuss typical phone movements inside a car and how DADD SYSTEM handles them.

Figure 17:
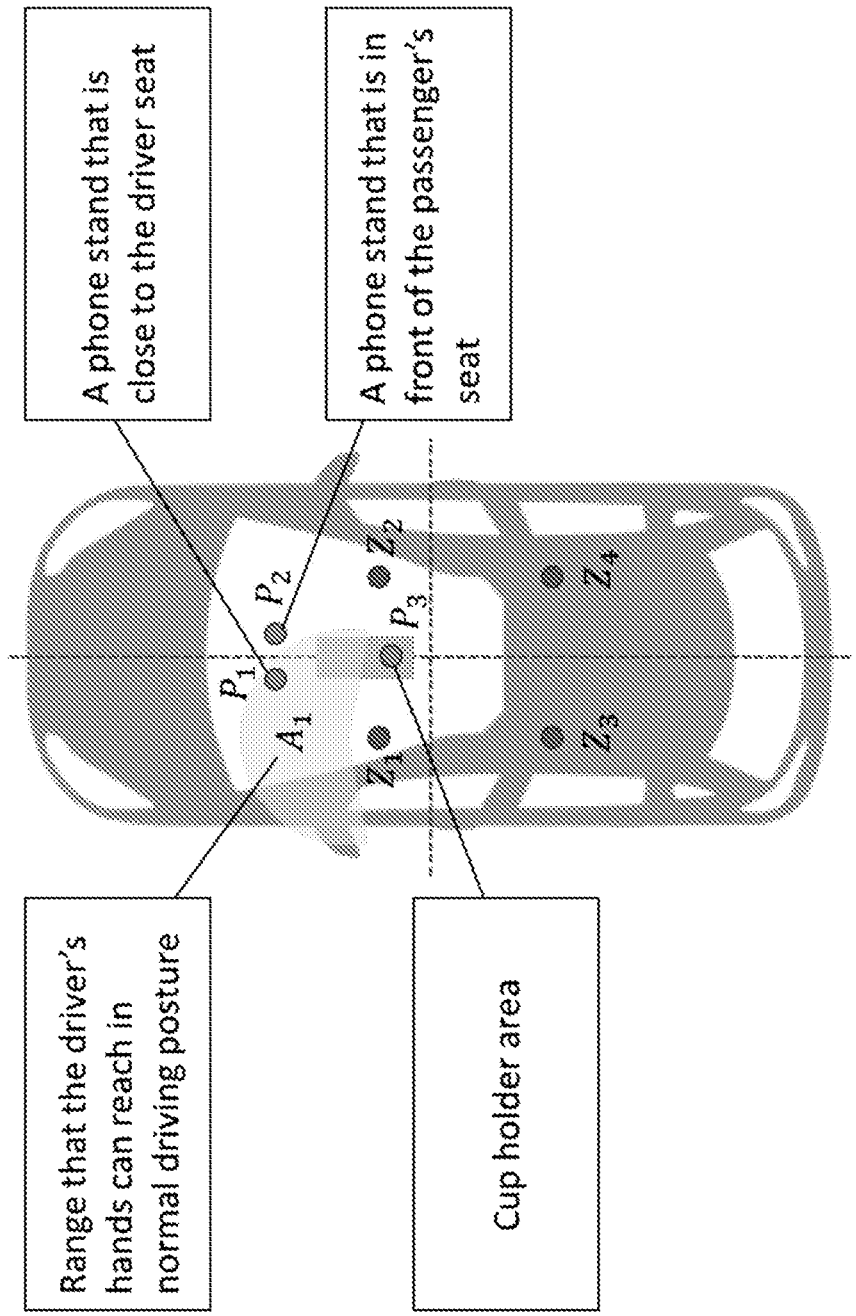
FIG. 17 is a diagram showing different scenarios in which the user places his phone in a phone stand or cup holder.

Users may place their phones on a phone stand or a cup holder after entering a car. The phone either enters the car with the driver into the driver seat, or enters the car with the driver's bag/purse into the front row passenger seat. FIG. 17 illustrates the settings of the phone being placed in a phone stand or a cup holder.

Upon entering with the driver case, DADD SYSTEM determines the phone to be in the driver seat upon detection of entering the car. If the user now takes the phone out of his pocket and places the phone in the cup holder (P3) or the phone stand in the driver seat (P1), DADD SYSTEM will consider this action as a small movement within the driver seat (Z1→Z1), and DADD SYSTEM will still determine the phone to be in the driver seat, thus prohibiting the driver from performing the functions disallowed in the driver seat.

Even if DADD SYSTEM determines the phone to have moved to Z2 although it actually moved to the cup holder, it will not endanger safety as the driver won't be able to use the phone without picking it up from the cup holder. On the other hand, the user may move the phone to a phone stand in front of the passenger seat (P2) for navigation. In this case, DADD SYSTEM can determine the phone to have moved out of the passenger seat, but the user will not be able to use the phone since it is too far to reach from the driver seat.

For entering from the front-row passenger seat (Z2) case, DADD SYSTEM will determine the phone to be in Z2. If the user moves the phone to a phone stand or to the cup holder in Z1, DADD SYSTEM will detect the Z2→Z1 movement and determines the phone to have been moved to the driver seat.

Another common case is that the phone is moved from a back seat to the driver seat, i.e., the phone was initially with another passenger in the back seat and then handed over to the driver. In this case, DADD SYSTEM demonstrates its ability to track the phone's movement inside the car even if it is not the driver's phone or the phone did not enter the car with the driver. Since DADD SYSTEM does not require the phone to be paired with the car BT system, the phone will follow the same procedure as mentioned earlier and determine whether the phone enters the driver seat.

Once the phone is determined to be in the driver seat, the phone's operating system will disable the texting but not other non-safety critical functions, thus reducing the risk of distracted driving.

In an experimental setup, DADD SYSTEM is implemented as an Android app and collects sensor data traces for its evaluation with Huawei Nexus 6P (Android 6.0), LG Nexus 5X (Android 6.0), and Sony Z1 (Android 5.1.1). Experiments were conducted on 3 different cars: Ford Explorer (SUV), Honda Fit (sedan), and Toyota Corolla (sedan). A Samsung Galaxy S6 Edge was mounted in front of the radio/infotainment system and used as a built-in BT transceiver inside the car. This phone purely acts as a BT device that broadcasts its presence. After detecting a phone movement, DADD SYSTEM determines whether its final location is in the driver seat or not.

Figure 18A:
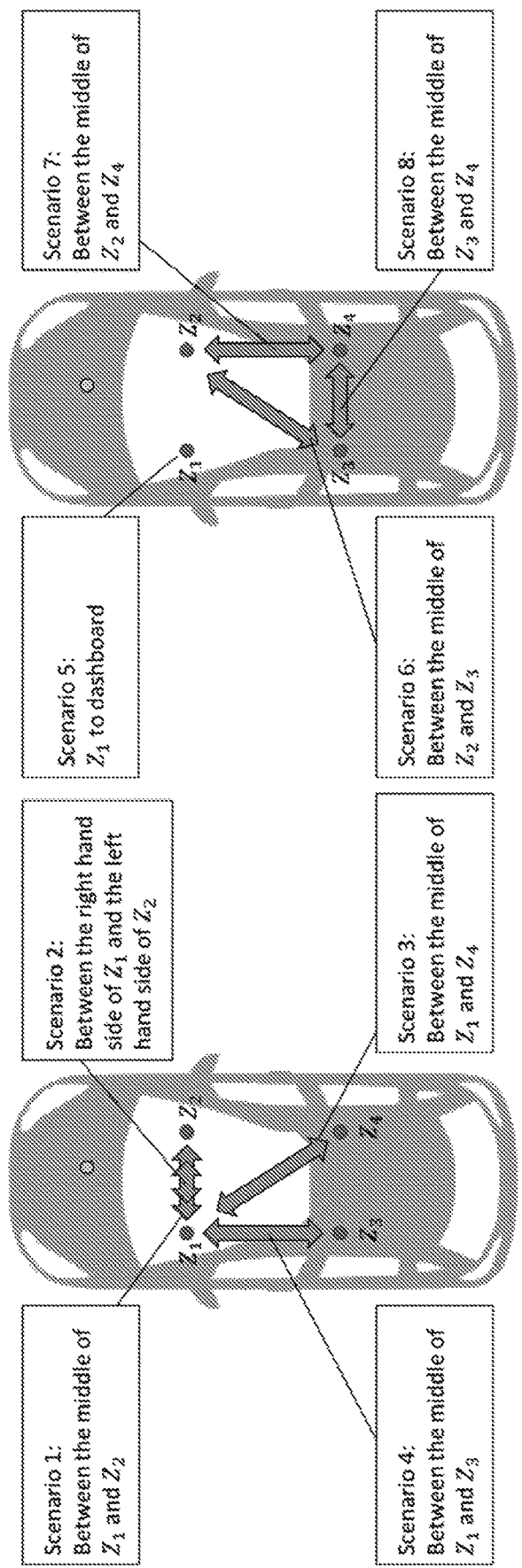
FIG. 18A is a diagram showings experimental scenarios in the car.

As shown in FIG. 18A, 8 scenarios were tested where the phones were passed between different seats. Each scenario represents a commonly seen in-car phone movement. In Scenarios 1-5, the phones were passed between the driver and passenger seats or moved within the driver seat. Other than the scenarios in which the phone is moved from the other three passenger seats, which incur large movements, we also tested the extreme scenarios in which the phone was moved over a short distance. In Scenarios 6-8, the phone was moved between two passenger seats.

In Scenario 1, the phone is moved between the driver seat and the front passenger seat. This is the case when the driver moves his phone from his bag/phone stand located in the front passenger seat or the passenger passes the phone to the driver and in their reverse directions. In Scenario 2, the driver places his phone in the cup holder and retrieves the phone from the cup holder. In Scenarios 3 and 4, a passenger in the back row hands his phone to the driver and the driver hands back the phone to the passenger. In Scenario 5, the driver places his phone on the dashboard. In Scenarios 6-8, the phone is passed between passengers or a passenger takes/puts the phone from/to another passenger seat.

Figure 18B:
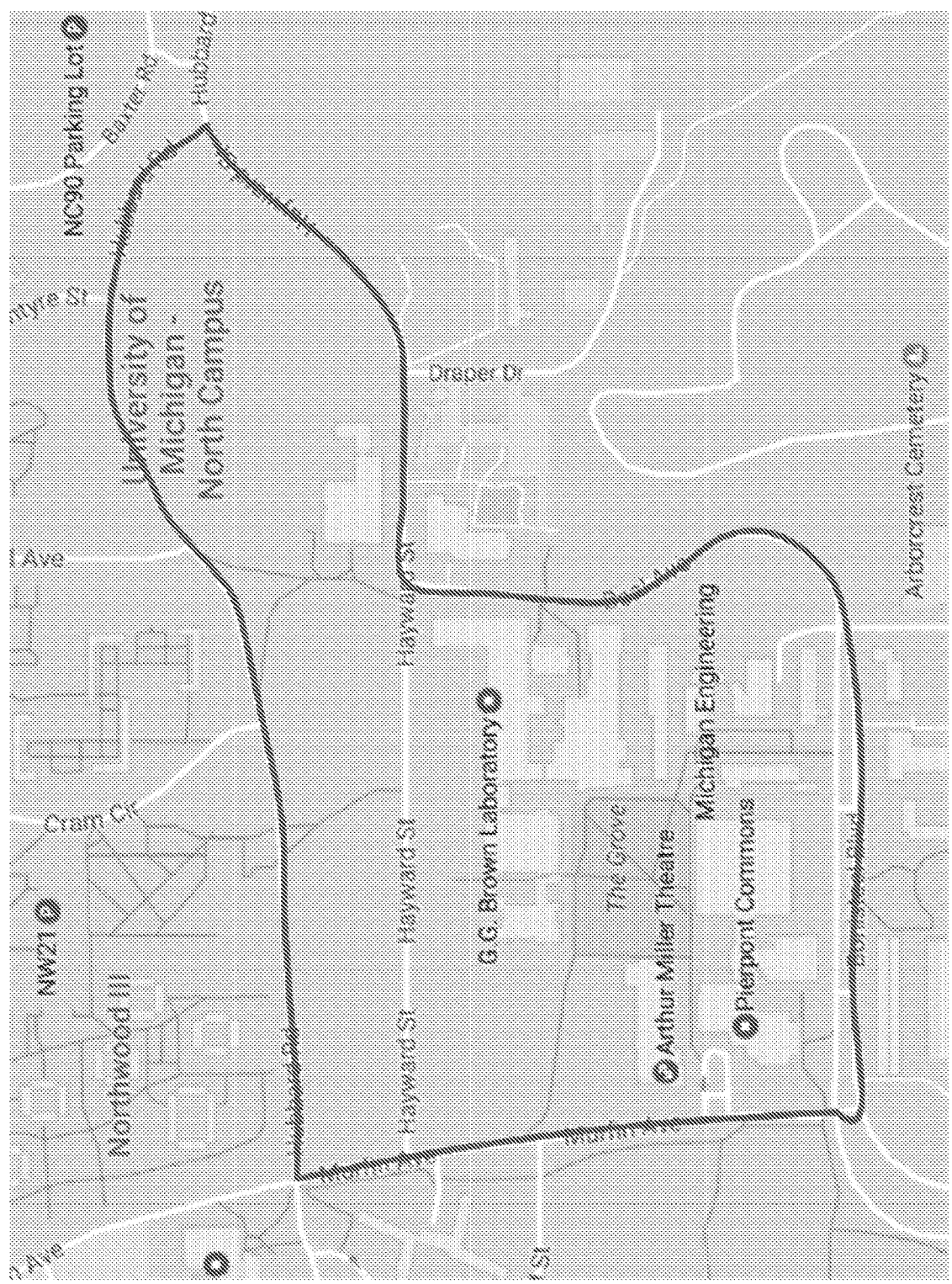
FIG. 18B is a map showing location of experiments conducted at the North Campus of University of Michigan.

All these experiments have been conducted at the North Campus of University Michigan. During these experiments, the cars were driven along the route shown in FIG. 18B. The speed limit of 25-35 mph was honored and the speeds of the cars were maintained at 20-35 mph, depending on the traffic. The route includes intersections with traffic lights, stop signs, and speed bumps. The three cars were all driven by their owners and there was at least one passenger sitting in a different seat to pass the phone. Except for Scenarios 2 and 5, the phone was originally in a passenger seat, moved to the driver seat or another passenger seat, and then moved back to the original passenger seat. We conducted the experiments during 9:00-11:00 AM or 4:00-6:00 PM. Experiments were conducted under different weather conditions, including snowing, raining, and sunny.

The parameters in DADD SYSTEM are chosen as follows. During the development of DADD SYSTEM, 150 movement traces were collected. These traces were used as the training set to determine the parameters for each component of DADD SYSTEM.

Table 3 below lists the thus-determined parameters. $TH_{gyro}$ is set to the recorded maximum angular speed magnitude when the phone stays still in a moving car and $TH^*_{gyro}$ is set to half of $TH_{gyro}$. $TH^*_{gyro}$ is a design parameter and can be chosen differently. The effect of choosing different $TH^*_{[<]BEGINITALmgyro}$ will be discussed. Similarly, $TH_{mag}$ is set to the maximum magnitude of magnetic field when the phone stays still in a moving car. We chose $T_{ext}$ as twice the sampling period in SLEEP mode to ensure enough time is reserved for offset compensation. $TH_{lat}$ and $TH_{f/b}$ were determined by the dimension of the car. $TH_{f/b}$ is set to a half of the distance between the front and the back seats, while $TH_{lat}$ is set to less than the gap between the driver seat and the front passenger seat.

TABLE 3

Parameter Settings

| Parameter | Value | unit | Used in |
|---|---|---|---|
| $TH^*_{gyro}$ | 0.2 | rad/s | Motion Detector |
| $TH_{gyro}$ | 0.4 | rad/s | Motion Detector |
| $TH_{mag}$ | 7.5 | µT/s | Motion Detector |
| $T_{ext}$ | 200 | ms | Motion Detector |
| $T_{BT}$ | 2 | s | BT Signal Processor |
| λ | 0.001 | N/A | BT Signal Processor |
| $TH_{mag, small}$ | 20 | µT | Case Constructor |
| $TH_{BT, small}$ | 5 | dBm | Case Constructor |
| $TH_{lat}$ | 0.1 | m | Case Constructor |
| $TH_{f/b}$ | 0.5 | m | Case Constructor |

Accuracy, false positive rate, and false negative rate are used to evaluate DADD SYSTEM. Accuracy is defined as the ratio of correctly identified cases to the total number of cases:

$$Accuracy = \frac{No.\ of\ Correct\ Cases}{Total\ No.\ of\ Cases}$$

A false positive occurs when the phone is not in the driver seat, but DADD SYSTEM determines it is in the driver seat. The false positive rate (FPR) is computer as:

$$FPR = \frac{No.\ of\ Cases\ Falsely\ Determined\ to\ be\ in\ Driver's\ Seat}{Total\ No.\ of\ Cases}$$

A false negative occurs when the phone is not in the driver seat, but DADD SYSTEM determines it is in the passenger's seat. The false negative rate (FNR) is computer as:

$$FNR = \frac{No.\ of\ Cases\ Failed\ to\ Detect\ in\ Driver\ Seat}{Total\ No.\ of\ Cases}$$

Table 4 summarizes evaluation results. In addition to the training set, 449 test cases with 25+ traces were collected for each scenario to evaluate DADD SYSTEM. The accuracy of detecting movements between the driver seat and a passenger seat (Scenarios 1-5) is 93.69% and that between passenger seats (Scenarios 6-8) is 87.12%. The overall accuracy of DADD SYSTEM is 91.77% with 4.00% FNR. As expected, the false positive rate (4.23%) is higher than the false negative rate (4.00%) due to DADD SYSTEM's Safety-First-Choice mechanism.

which the phone was moved from the passenger seats to the driver seat were taken and an incorrect initial position was used to evaluate DADD SYSTEM's performance with incorrect information. For every trace, we tested the condi-

TABLE 4

DADD's performance with correct last known location

| Scenario | Car Type | No. of Cases to Driver Seat | No. of Cases to Passenger Seats | Total No. of Cases | FP | FPR (%) | FN | FNR (%) | Acc. (%) |
|---|---|---|---|---|---|---|---|---|---|
| 1 | SUV | 29 | 27 | 56 | 1 | 1.79 | 2 | 3.57 | 94.64 |
| 1 | Sedan | 6 | 6 | 12 | 0 | 0.00 | 0 | 0.00 | 100.00 |
| Subtotal | | 35 | 33 | 68 | 1 | 1.47 | 2 | 2.94 | 95.59 |
| 2 | SUV | 22 | 27 | 49 | 0 | 0.00 | 1 | 2.04 | 97.96 |
| 2 | Sedan | 22 | 13 | 35 | 0 | 0.00 | 1 | 2.38 | 97.14 |
| Subtotal | | 44 | 40 | 84 | 0 | 0.00 | 2 | 2.20 | 97.62 |
| 3 | SUV | 23 | 29 | 52 | 1 | 1.92 | 3 | 5.77 | 92.31 |
| 3 | Sedan | 7 | 7 | 14 | 0 | 0.00 | 1 | 7.14 | 92.86 |
| Subtotal | | 30 | 36 | 66 | 1 | 1.52 | 4 | 6.06 | 92.42 |
| 4 | SUV | 29 | 34 | 63 | 0 | 0.00 | 7 | 11.11 | 88.89 |
| 4 | Sedan | 5 | 5 | 10 | 0 | 0.00 | 1 | 10.00 | 90.00 |
| Subtotal | | 34 | 39 | 73 | 0 | 0.00 | 8 | 10.96 | 89.04 |
| 5 | SUV | 19 | — | 19 | 0 | 0.00 | 2 | 10.53 | 89.47 |
| 5 | Sedan | 7 | — | 7 | 0 | 0.00 | 0 | 0.00 | 100.00 |
| Subtotal | | 26 | — | 26 | 0 | 0.00 | 2 | 7.69 | 92.31 |
| Scenario 1-5 subtotal | | — | — | 317 | 2 | 0.63 | 18 | 5.68 | 93.69 |
| | | To Left/Front | To Right/Back | | | | | | |
| 6 | SUV | 12 | 10 | 22 | 3 | 13.64 | — | — | 86.36 |
| 6 | Sedan | 10 | 10 | 20 | 4 | 20.00 | — | — | 80.00 |
| Subtotal | | 22 | 20 | 42 | 7 | 16.67 | — | — | 83.33 |
| 7 | SUV | 10 | 16 | 26 | 1 | 3.85 | — | — | 96.15 |
| 7 | Sedan | 9 | 9 | 18 | 4 | 22.22 | — | — | 77.78 |
| Subtotal | | 19 | 25 | 44 | 5 | 11.36 | — | — | 88.64 |
| 8 | SUV | 16 | 10 | 26 | 4 | 15.38 | — | — | 84.62 |
| 8 | Sedan | 10 | 10 | 20 | 1 | 5.00 | — | — | 95.00 |
| Subtotal | | 26 | 20 | 46 | 5 | 10.87 | — | — | 89.13 |
| Scenario 6-8 subtotal | | 67 | 65 | 132 | 17 | 12.88 | — | — | 87.12 |

The accuracies of Scenarios 3 (92.42%) and 4 (89.04%) are slightly lower than those of Scenarios 1 (95.59%) and 2 (97.62%) because movements between the front and the back row seats are more susceptible to the noise generated by the car. Similar results were also observed in Scenarios 5 and 6.

For Scenarios 6-8, the cases tested in SUV and sedan show a larger accuracy difference than Scenarios 1-5. For Scenarios 6 and 7, the movement distance in sedan is shorter than in SUV, thus becoming more susceptible to the noise generated by the car. Since DADD SYSTEM's Safety-First-Choice mechanism will assume the phone in the driver seat when the case matching yields a tie, those cases will be classified to be in the driver seat and lead to a larger false positive rate. Furthermore, since the sedan tends to have lesser distance separation between seats, the multi-path effect of BT signal results in more unpredictable RSSI patterns. Therefore, Scenario 7 has a lower accuracy than the other scenarios in the sedan.

Since DADD SYSTEM utilizes the last known location for estimation, consider the condition under which the last known location is incorrect. The 143 traces (Scenario 1-4) in which the phone was moved from the passenger seats to the driver seat were taken and an incorrect initial position was used to evaluate DADD SYSTEM's performance with incorrect information. For every trace, we tested the condition in which DADD SYSTEM used the other 2 passenger seats as the initial locations. The average accuracy degrades to 70.23%. That is, DADD SYSTEM can still achieve acceptable accuracy even if the underlying detection of entering a car does not provide correct information. More specifically, DADD SYSTEM can achieve higher than 90% accuracy for detection of entering the driver seat even if the initial location has only 65% accuracy:

$$93.69\% \times 65\% + 70.23\% \times 35\% = 85.48\%$$

Next, energy consumption was evaluated based on the battery profile provided by Android which updates the file "current_now" in its battery profile periodically. Since the update rate depends on the implementation of the phone manufacturers who tend to set a low update rate, one needs to modify the kernel of the phone to achieve the required update rate. For example, the default update period for Nexus 5X is about 30 s, so modify its kernel to achieve the highest update rate that its power management chipset can achieve, i.e., 1 Hz. Nexus 5X and Sony Z1 were used for energy consumption evaluation because they can achieve the desirable update rate.

DADD SYSTEM's energy consumption in SLEEP and ACTIVE modes is evaluated from two perspectives. First, the energy overhead is evaluated for sensor data collection only (denoted by "s"), which indicates a lower bound of the overhead. Second, the overall energy overhead is evaluated by considering both sensor data collection and computation (denoted by "s+c"), which indicates an upper bound of energy overhead.

Figure 19:
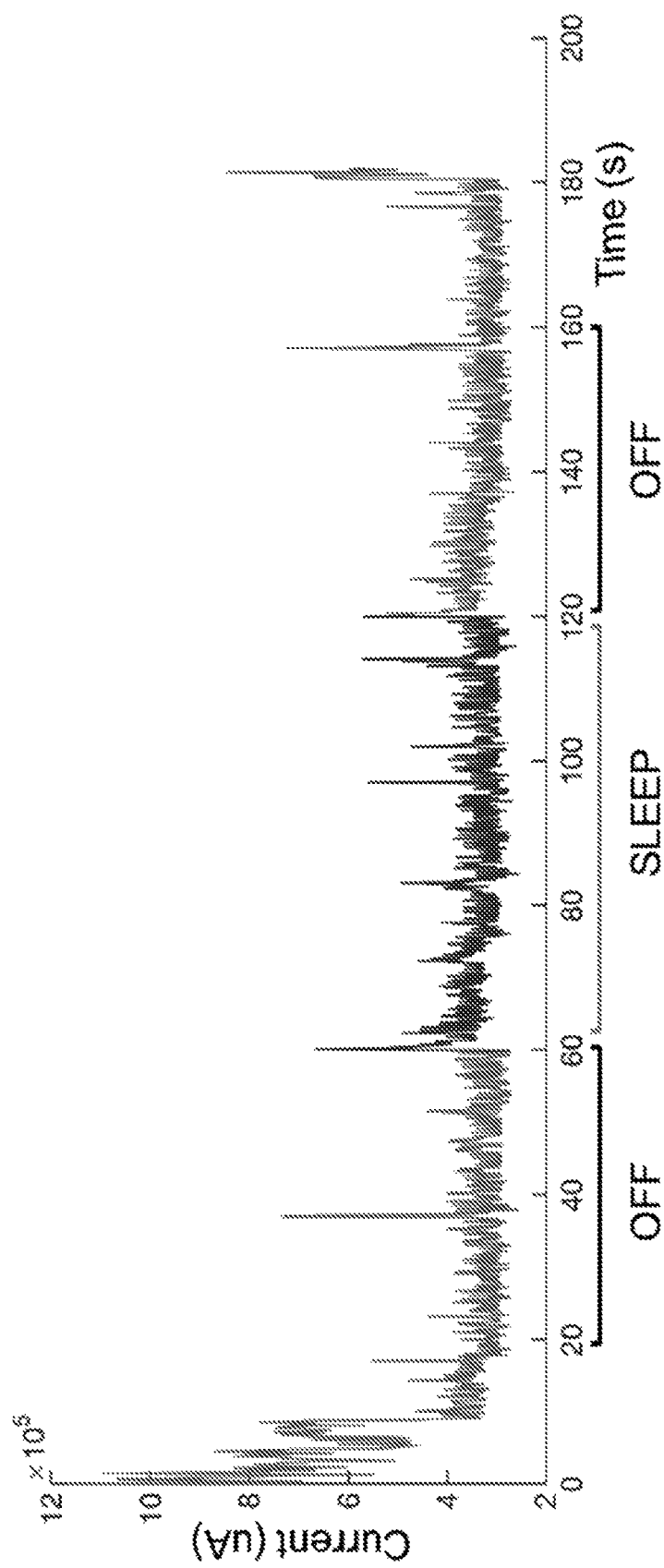
FIG. 19 is a graph showing an example of electric current in testing SLEEP mode.
Figure 20:
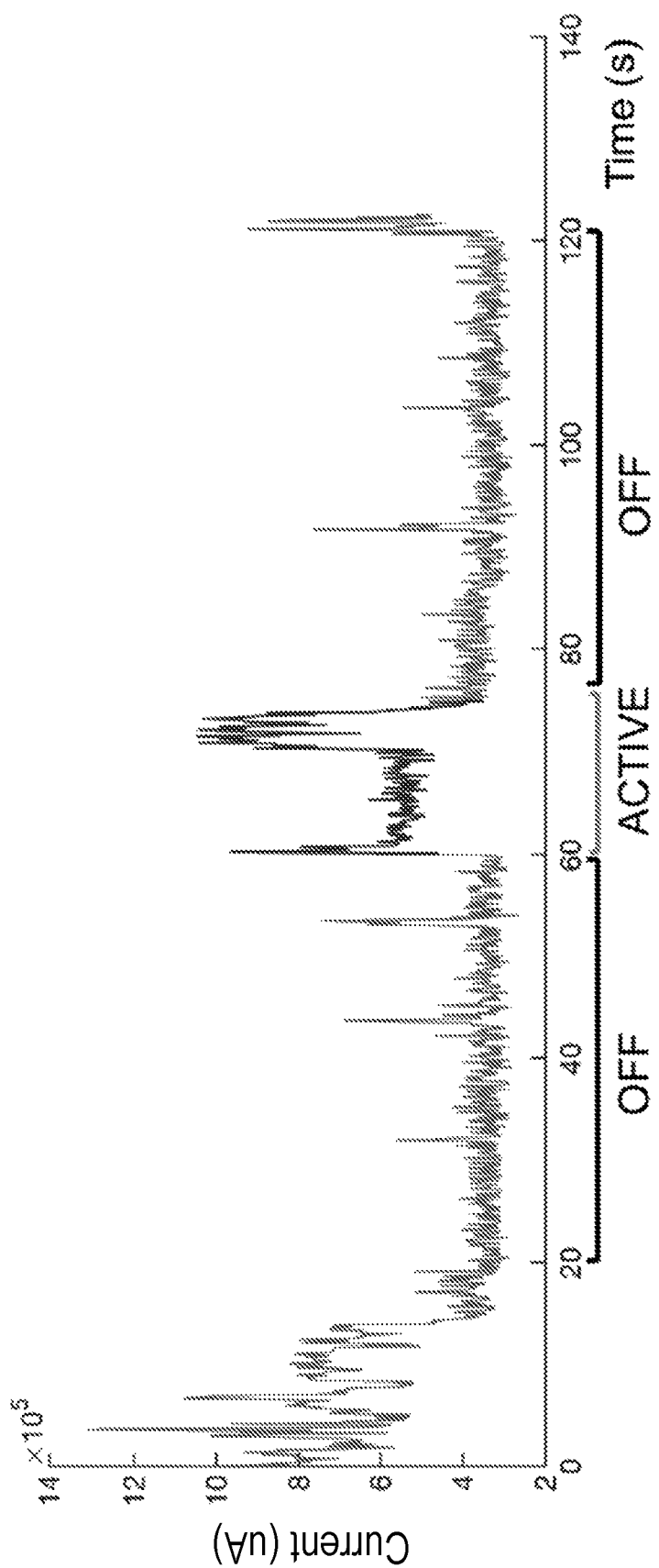
FIG. 20 is a graph showing an example of electric current in testing ACTIVE mode.

The testing scenarios for SLEEP and ACTIVE mode operation are shown in FIGS. 19 and 20, respectively. To record the trace of battery discharge current, manually activate and turn off a certain mode. The current traces are recorded in the sequence of OFF mode→SLEEP/ACTIVE mode→OFF mode After measuring the energy overhead of DADD SYSTEM in SLEEP and ACTIVE modes, we evaluate the effectiveness of the proposed energy-saving mechanism by measuring the false negative rate ($FNR_e$) and the false positive rate ($FPR_e$) of entering ACTIVE mode. FNRe is defined as the ratio of the time that the phone is moving while DADD SYSTEM is still in SLEEP mode to the total time that the phone is moving:

$$FNR_e = \frac{\sum_i T_{moving,SLEEP,i}}{\sum_i T_{moving,i}}$$

$FNR_e$ indicates the missed detection time when the phone is moving. Therefore, the higher $FNR_e$, the lower localization accuracy. Similarly, $FPR_e$ is defined as the ratio of the time that the phone stays still, but DADD SYSTEM is in ACTIVE mode, to the total time that the phone stays still:

$$FPR_e = \frac{\sum_i T_{still,ACTIVE,i}}{\sum_i T_{still,i}}$$

While $FPR_e$ does not have direct influence on the localization accuracy, it indicates how much energy is wasted due to falsely entering ACTIVE mode. We utilize the same set of experiment traces to calculate $FNR_e$ and collect additional 4 traces that the phones stayed still in the cars to calculate $FPR_e$.

Table 6 summarizes the results of energy consumption overhead. Compare the energy overhead in two scenarios: "Screen On" and "Screen Off". "Screen On" is the case when the phone screen is adjusted to 50% brightness and "Screen Off" is the case when the screen is turned off. Compared to the energy consumption with the screen off, DADD SYSTEM incurs 18.62% overhead in SLEEP mode (Z1) and 686% overhead in ACTIVE mode (Z1). These energy consumptions overheads may seem overwhelming, but the overall overhead will be much smaller when the energy savings mechanism is used. The time duration that DADD SYSTEM operates in SLEEP and ACTIVE modes is significantly less than the time in OFF mode. According to the statistics provided by American Automobile Association Foundation for Traffic Safety, the average driving time for a driver is 70.2 minutes per day. Assuming that the phone moves every 5 minutes in a car and each movement last 5 seconds, the average energy overhead per day is:

$$\text{Energy Overhead} = \frac{\left(\sum_i |T_{active,i}|\right) \times OH_{active} + \left(\sum_j |T_{sleep,j}|\right) \times OH_{sleep}}{|T_{day}|} \quad (7)$$

$$= \frac{\left(70.2 \times 60 - \frac{70.2}{5} \times 5\right) \times 18.62\% + \left(\frac{70.2}{5} \times 5\right) \times 686\%}{24 \times 3600} \quad (8)$$

$$= 1.45\% \quad (9)$$

In summary, DADD SYSTEM can achieve 91.77% accuracy for real-time in-car location estimation with only additional 1.45% energy overhead per day.

TABLE 5

DADD's energy overhead on Sony Z1 and Nexus 5X

| | | | | | Screen On | | | Screen Off | |
|---|---|---|---|---|---|---|---|---|---|
| Phone | Mode | SLEEP OH. (μA) | ACTIVE OH. (μA) | OFF Current (μA) | SLEEP OH. (%) | ACTIVE OH. (%) | OFF Current (μA) | SLEEP OH. (%) | ACTIVE OH. (%) |
| Z1 | s | 7670 | 186310 | 342792 | 2.24 | 54.35 | 43422 | 17.66 | 429.07 |
|  | s + c | 8087 | 298293 | 342792 | 2.36 | 87.02 | 43422 | 18.62 | 686.96 |
| 5X | s | 2330 | 128180 | 350367 | 0.67 | 36.58 | 80659 | 2.89 | 158.92 |
|  | s + c | 5494 | 198489 | 350367 | 1.57 | 56.65 | 80659 | 6.81 | 246.08 |

The average time of entering ACTIVE mode is 235 ms and that of going back to SLEEP mode is 2 ms. Since there is a time margin between entering ACTIVE mode and the movement detection (the time difference between exceeding $TH^*_{gyro}$ and $TH_{gyro}$), the 235 ms delay will not have much effect on the localization accuracy.

Now, let's consider the practical scenario when false positive and false negative of entering ACTIVE mode can occur. The effectiveness of the proposed energy-saving mechanism is evaluated by evaluating the tradeoff between energy consumption and the localization accuracy with different parameter settings for entering ACTIVE mode. Define the threshold ratio $R_{ACTIVE}$ to be the ratio of the threshold for entering ACTIVE mode to the threshold used for motion detection:

$$R_{ACTIVE} = \frac{TH^*_{gyro}}{TH_{gyro}}$$

Table 6 shows the evaluation results of the proposed energy-saving mechanism. We present the $FPR_e$, $FNR_e$, energy overhead, and accuracies when $R_{ACTIVE}$ is set to 0.5, 0.75 and 1 by adjusting $TH^*_{gyro}$. The energy overhead is calculated based on the same settings as we calculated the ideal case while taking $FPR_e$ into consideration.

As shown in Table 6, if we set $R_{ACTIVE}$ to be a small value (0.5), DADD SYSTEM will have high $FPR_e$ (23%) and low $FNR_e$ (2.7%). That is, DADD SYSTEM will enter ACTIVE mode more frequently with higher energy consumption and less miss detection time. Therefore, DADD SYSTEM is able to achieve higher accuracy (91.77%). When $R_{ACTIVE}$ increases, DADD SYSTEM will have less $FPR_e$, but more FNRe and less localization accuracy. This tradeoff energy consumption and localization accuracy is a design choice. Developers can choose their preference when implementing the system. We recommend setting $R_{ACTIVE}$ to lower than 0.75 to ensure 85+% accuracy. The proposed energy-saving mechanism is shown to be able to reduce 98.69% energy overhead (from 686.96% to only 9%) per day in practical usage scenario.

Another way to reduce the energy consumption overhead further is reducing the sampling rate of the accelerometer. Let's consider different sampling rates for trajectory estimation. Table 7 shows the localization accuracy at different sampling rates. Similarly, we use the same set of traces used in Section 6 and down sampling the acceleration data for accuracy evaluation.

The tested sampling periods are 5 (default), 10, 50 and 100 ms. As expected, the localization accuracy drops when the sampling period increases. We can observe that the localization accuracy drops to around 85% when the sampling rate decreases to 20 Hz. Thus, we suggest the sampling rate set to at least 20 Hz. It is worth mentioning that adjusting sensor sampling rate on Android devices may not have the desired effect on the energy consumption reduction. Since Android API does not provide functions to directly control the sampling period of a sensor, the sampling period that we can set in registerListener4 is just a hint/suggestion to the operating system, indicating the desired sampling period and the resulting sampling period highly depends on the implementation of the phone manufacturers. During our evaluation, we did not observe any sampling period difference when the sampling period is set to 5-50 ms. Therefore, we do not provide the energy overhead measurements. In summary, adjusting $R_{ACTIVE}$ is a better way to obtain the desired accuracy and energy consumption setting.

TABLE 6

DADD's tradeoff between energy consumption and localization accuracy

| $R_{ACTIVE}$ | $FNR_e$ (%) | $FPR_e$ (%) | Energy OH per day when considering $FPR_e$ % | Energy Saved Compared to No Energy Saving Mechanism (%) | Accuracy (%) |
|---|---|---|---|---|---|
| 0.50 | 2.7 | 23 | 9 | 98.69 | 91.77 |
| 0.75 | 5.5 | 2.5 | 2.3 | 99.67 | 85.93 |
| 1.00 | 9.2 | 0 | 1.45 | 99.79 | 83.93 |

TABLE 7

Localization accuracy for different acceleration sampling rates where 5 ms is the default sampling period in DADD

| Sampling Period (ms) | Sampling Rate (Hz) | Accuracy (%) |
|---|---|---|
| 5 | 200 | 91.77 |
| 10 | 100 | 89.04 |
| 50 | 20 | 84.82 |
| 100 | 10 | 73.00 |

Discussed below are some related topics/issues that have not been covered so far, including how to make DADD SYSTEM more user-friendly and extend DADD SYSTEM for general in-car phone localization services.

DADD SYSTEM's Safety-First-Choice mechanism tends to predict that the phone is in the driver seat. To enhance user experience, developers may implement a popup with an instruction to let the user "unlock" his phone by moving it to another seat and then moving it back. That way, DADD SYSTEM will be triggered and provide a new location.

Since DADD SYSTEM utilizes gyroscope and GPS for movement detection, a user can spoof the detection of DADD SYSTEM by moving his phone to the driver seat during a turn. To ensure safety, DADD SYSTEM should determine the phone to be in the driver seat whenever making a turn is detected by examining GPS data. If a passenger's phone is "locked" because of the occurrence of a turn, he can use the "unlock" mechanism to resolve this false positive situation.

In the original design, DADD SYSTEM adopts a three-level matching mechanism in which only 0 or ±1 can be used to indicate the matching level and each column is calculated independently. A natural enhancement for case matching is to adopt a multi-level matching mechanism. If DADD SYSTEM needs to be extended for more fine-grained localization (e.g., to determine the phone's position within a seat), one need to consider a continuous variable rather than the discrete one for a moving trajectory.

DADD SYSTEM is designed to be deployed as a built-in function in the operating system of smartphones, such as Android or iOS. Users will not be able to manually turn off DADD SYSTEM. To discuss the deployment incentives of DADD SYSTEM, we consider four parties: users, phone manufacturers, car manufacturers, and insurance companies.

For insurance companies, they want to prevent car accidents to boost their pro t. To identify which customers have better driving habits and to make their customers drive more safely, the insurance companies will be willing to provide their customers premium discounts if their customers choose to use devices that have driving behavior tracking functions. Thus, users will have incentives to choose to buy and use phones with DADD SYSTEM. Consequently, phone manufacturers will also have incentives to produce phones with DADD SYSTEM.

For car manufacturers, since they just need to embed the car information in the built-in Bluetooth transceiver to build a DADD SYSTEM-compatible car, they won't have any problem in deploying DADD SYSTEM. Furthermore, their cars will have less accidents thanks to DADD SYSTEM which can increase their sales. Last but not the least, the most obvious incentive for users to choose the phones with DADD SYSTEM function is to make them safer.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various computer systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for determining location of a mobile device in a vehicle, comprising:
   detecting motion of the mobile device in the vehicle between a starting position of the mobile device and an ending position of the mobile device;
   determining, by a processor in the mobile device, front/back motion trajectory of the mobile device during motion of the mobile device between the starting position and the ending position, where the front/back motion trajectory is determined using a motion sensor in the mobile device and is defined in relation to a first axis that aligns with direction the vehicle is travelling;
   determining, by the processor in the mobile device, a trend in front/back motion trajectory during motion of the mobile device between the starting position and the ending position;
   determining, by the processor in the mobile device, lateral motion trajectory of the mobile device during motion of the mobile device between the starting position and the ending position, where the lateral motion trajectory is defined in relation to a second axis that is perpendicular to the first axis and parallel to ground;
   determining, by the processor in the mobile device, a trend in lateral motion trajectory during motion of the mobile device between the starting position and the ending position; and
   determining, by the processor in the mobile device, a present location of the mobile device in the vehicle using the trend in front/back motion trajectory and the trend in lateral motion trajectory.

2. The method of claim 1 wherein detecting motion of the mobile device in the vehicle is based on at least one of angular velocity of the mobile device as measured by an gyroscope in the mobile device and rate of change of magnetic field measured by a magnetometer in the mobile device.

3. The method of claim 1 wherein determining front/back motion trajectory of the mobile device further comprises
   measuring, by an accelerometer in the mobile device, acceleration of the mobile device;
   transforming the measured acceleration of the mobile device to a coordinate system associated with the vehicle;
   compensating the transformed acceleration by subtracting acceleration of the vehicle from the transformed acceleration of the mobile device; and
   integrating the compensated acceleration of the mobile device to derive velocity of the mobile device.

4. The method of claim 3 wherein transforming the measured acceleration of the mobile device includes determining direction the vehicle is travelling and determining a vector indicative of Earth's gravity.

5. The method of claim 1 wherein determining a trend in front/back motion trajectory or in lateral motion trajectory includes classifying the change as one of increasing, decreasing, or no change.

6. The method of claim 1 wherein determining a present location of the mobile device in the vehicle further comprises comparing the trend in front/back motion trajectory and the trend in lateral motion trajectory to a set of predetermined signatures, such that each signature in the set of predetermined signatures represents a unique movement of the mobile device between two locations in the vehicle, wherein the trend in front/back motion trajectory and the trend in lateral motion trajectory collectively form a signature for the detected motion of the mobile device between the starting position and the ending position.

7. The method of claim 6 wherein each signature in the set of predetermined signatures represents a unique movement of the mobile device between two seats in the vehicle.

8. The method of claim 1 further comprises determining the present location of the mobile device to be a seat for a driver of the vehicle and disabling select features of the mobile device in response to determining the present location of the mobile device to be the driver's seat.

9. A method for determining location of a mobile device in a vehicle, comprising:
   detecting motion of the mobile device in the vehicle between a starting position of the mobile device and an ending position of the mobile device;
   measuring, by a magnetometer in the mobile device, magnitude of magnetic field during motion of the mobile device between the starting position and the ending position;

determining, by a processor in the mobile device, a trend in magnitude of the magnetic field during motion of the mobile device between the starting position and the ending position;

measuring, by a wireless transceiver in the mobile device, received signal strength from a given transmitter in the vehicle during motion of the mobile device between the starting position and the ending position, where the given transmitter has a fixed position in the vehicle;

determining, by the processor in the mobile device, a trend in the received signal strength during motion of the mobile device between the starting position and the ending position;

determining, by the processor in the mobile device, front/back motion trajectory of the mobile device during motion of the mobile device between the starting position and the ending position, where the front/back motion trajectory is determined using a motion sensor in the mobile device and is defined in relation to a first axis that aligns with direction the vehicle is travelling;

determining, by the processor in the mobile device, a trend in front/back motion trajectory during motion of the mobile device between the starting position and the ending position;

determining, by the processor in the mobile device, lateral motion trajectory of the mobile device during motion of the mobile device between the starting position and the ending position, where the lateral motion trajectory is defined in relation to a second axis that is perpendicular to the first axis and parallel to ground;

determining, by the processor in the mobile device, a trend in lateral motion trajectory during motion of the mobile device between the starting position and the ending position; and determining, by the processor in the mobile device, a present location of the mobile device in the vehicle using the trend in magnitude of the magnetic field, the trend in the received signal strength, the trend in front/back motion trajectory and the trend in lateral motion trajectory.

10. The method of claim 9 wherein detecting motion of the mobile device in the vehicle is based on at least one of angular velocity of the mobile device as measured by an gyroscope in the mobile device and rate of change of magnetic field measured by the magnetometer in the mobile device.

11. The method of claim 9 wherein determining a trend in the received signal strength includes applying ridge regression filtering to the measured received signal strength.

12. The method of claim 9 wherein determining a trend in the received signal strength includes classifying the change in the received signal strength as one of no change, increasing, decreasing, concave or convex.

13. The method of claim 9 wherein determining front/back motion trajectory of the mobile device further comprises measuring, by an accelerometer in the mobile device, acceleration of the mobile device;

transforming the measured acceleration of the mobile device to a coordinate system associated with the vehicle;

compensating the transformed acceleration by subtracting acceleration of the vehicle from the transformed acceleration of the mobile device; and integrating the compensated acceleration of the mobile device to derive velocity of the mobile device.

14. The method of claim 13 wherein transforming the measured acceleration of the mobile device includes determining direction the vehicle is travelling and determining a vector indicative of Earth's gravity.

15. The method of claim 9 wherein determining a trend in front/back motion trajectory or in lateral motion trajectory includes classifying the change as one of increasing, decreasing, or no change.

16. The method of claim 9 wherein determining a present location of the mobile device in the vehicle further comprises comparing the trend in magnitude of the magnetic field, the trend in the received signal strength, the trend in front/back motion trajectory and the trend in lateral motion trajectory to a set of predetermined signatures, such that each signature in the set of predetermined signatures represents a unique movement of the mobile device between two locations in the vehicle, wherein the trend in magnitude of the magnetic field, the trend in the received signal strength, the trend in front/back motion trajectory and the trend in lateral motion trajectory collectively form a signature for the detected motion of the mobile device between the starting position and the ending position.

17. The method of claim 16 wherein each signature in the set of predetermined signatures represents a unique movement of the mobile device between two seats in the vehicle.

18. The method of claim 9 further comprises determining the present location of the mobile device to be a seat for a driver of the vehicle and disabling select features of the mobile device in response to determining the present location of the mobile device to be the driver's seat.

19. A system for determining location of a mobile device in a vehicle, comprising:

a motion sensor residing in the mobile device;

a motion detector module in data communication with the motion sensor and operates to detect motion of the mobile device between a starting position of the mobile device and an ending position of the mobile device;

a front/back trajectory estimator module in data communication with the motion sensor, the front/back trajectory estimator module operates to determine front/back motion trajectory of the mobile device during motion of the mobile device between the starting position and the ending position and determines a trend in front/back motion trajectory during motion of the mobile device between the starting position and the ending position, where the front/back motion trajectory is defined in relation to a first axis that aligns with direction the vehicle is travelling;

a lateral trajectory estimator module in data communication with the motion sensor, the lateral trajectory estimator module determines lateral motion trajectory of the mobile device during motion of the mobile device between the starting position and the ending position and determines a trend in lateral motion trajectory during motion of the mobile device between the starting position and the ending position, where the lateral motion trajectory is defined in relation to a second axis that is perpendicular to the first axis and parallel to ground;

a location estimator module is configured to receive the trend in front/back motion trajectory and the trend in lateral motion trajectory and determines a present location of the mobile device in the vehicle using the trend in front/back motion trajectory and the trend in lateral motion trajectory, where the motion detector module, the front/back trajectory estimator module, the lateral trajectory estimator module and the location estimator module are implemented by a computer processor residing in the mobile device.

20. The system of claim 19 wherein the motion sensor is further defined as an accelerometer.

21. The system of claim 19 wherein the front/back motion trajectory estimator module receives acceleration of the mobile device from an accelerometer in the mobile device; transforms the measured acceleration of the mobile device to a coordinate system associated with the vehicle; compensates the transformed acceleration by subtracting acceleration of the vehicle from the transformed acceleration of the mobile device; and integrates the compensated acceleration of the mobile device to derive velocity of the mobile device.

22. The system of claim 19 wherein the location estimator module determines a present location of the mobile device in the vehicle by comparing the trend in front/back motion trajectory and the trend in lateral motion trajectory to a set of predetermined signatures, such that each signature in the set of predetermined signatures represents a unique movement of the mobile device between two locations in the vehicle, wherein the trend in front/back motion trajectory and the trend in lateral motion trajectory collectively form a signature for the detected motion of the mobile device between the starting position and the ending position.

23. The system of claim 19 wherein the location estimator module, in response to a determination that the present location of the mobile device is a seat for the driver of the vehicle, disables select features of the mobile device.

24. The system of claim 19 further comprises
a magnetometer configured to measure magnitude of magnetic field during motion of the mobile device between the starting position and the ending position; and
a magnetic processor configured to receive the magnetic field measures and determine a trend in magnitude of the magnetic field during motion of the mobile device between the starting position and the ending position wherein the location estimator module determines the present location of the mobile device in the vehicle in part based on the trend in magnitude of the magnetic field.

25. The system of claim 19 further comprises
a wireless transceiver configured to measure received signal strength from a given transmitter in the vehicle during motion of the mobile device between the starting position and the ending position; and
a signal processor configured to receive the measured signal strength and determine a trend in the received signal strength during motion of the mobile device between the starting position and the ending position, wherein the location estimator module determines the present location of the mobile device in the vehicle in part based on the trend of the received signal strength.

26. The system of claim 19 wherein the motion detector module increases the sampling rate of the motion sensor upon detecting motion of the mobile device and reduces the sampling rate of the motion sensor in absence of motion of the mobile device.

* * * * *